(12) United States Patent
Hedges et al.

(10) Patent No.: US 12,471,965 B2
(45) Date of Patent: Nov. 18, 2025

(54) ROD REDUCTION INSTRUMENT AND METHOD FOR SPINAL SURGERY

(71) Applicant: Alphatec Spine, Inc., Carlsbad, CA (US)

(72) Inventors: Connor Hedges, Encinitas, CA (US); Nathan R. Smith, Carlsbad, CA (US); Scott Robinson, Encinitas, CA (US); Fernando Olea, Escondido, CA (US)

(73) Assignee: ALPHATEC SPINE, INC., Carlsbad, CA (US)

( * ) Notice: Subject to any disclaimer, the term of this patent is extended or adjusted under 35 U.S.C. 154(b) by 70 days.

(21) Appl. No.: 18/442,074

(22) Filed: Feb. 14, 2024

(65) Prior Publication Data
US 2025/0255650 A1    Aug. 14, 2025

(51) Int. Cl.
*A61B 17/70* (2006.01)
*A61B 17/16* (2006.01)
*A61B 17/00* (2006.01)

(52) U.S. Cl.
CPC ...... *A61B 17/7086* (2013.01); *A61B 17/1631* (2013.01); *A61B 17/7082* (2013.01); *A61B 2017/00367* (2013.01); *A61B 2017/0046* (2013.01)

(58) Field of Classification Search
CPC .......... A61B 17/7086; A61B 17/1631
See application file for complete search history.

(56) References Cited

U.S. PATENT DOCUMENTS

| | | | |
|---|---|---|---|
| 6,440,133 B1* | 8/2002 | Beale | A61B 17/7086 606/86 R |
| 2005/0192587 A1* | 9/2005 | Lim | A61B 17/7086 606/86 R |
| 2006/0069391 A1* | 3/2006 | Jackson | A61B 17/7001 606/62 |
| 2008/0234678 A1* | 9/2008 | Gutierrez | A61B 17/7086 606/86 R |
| 2015/0100098 A1 | 4/2015 | Moore | |
| 2015/0142067 A1 | 5/2015 | Bess et al. | |
| 2019/0125417 A1 | 5/2019 | Fischer | |

FOREIGN PATENT DOCUMENTS

EP    3054871 B1 *  5/2022 ......... A61B 17/7086

OTHER PUBLICATIONS

International Searching Authority, "International Search Report and Written Opinion," for PCT Application No. PCT/US2025/015394, May 12, 2025.

* cited by examiner

*Primary Examiner* — Christian A Sevilla
(74) *Attorney, Agent, or Firm* — Dentons Durham Jones Pinegar; Sarah W. Matthews; Lilly Godfrey

(57) ABSTRACT

Disclosed rod reduction systems include an elongated housing having a longitudinal bore and a transverse channel extending through the elongated housing at a non-zero degree angle relative to the longitudinal bore. An insert is slideable within the transverse channel between an outwardly displaced position and an inwardly biased position. The insert includes a threaded portion and a longitudinal bore alignable with the longitudinal bore of the elongated housing. A reducer is slidably receivable within the longitudinal bore of the elongated housing. The reducer may have a longitudinal bore therethrough, a drive shaft positioned within the longitudinal bore of the reducer.

20 Claims, 29 Drawing Sheets

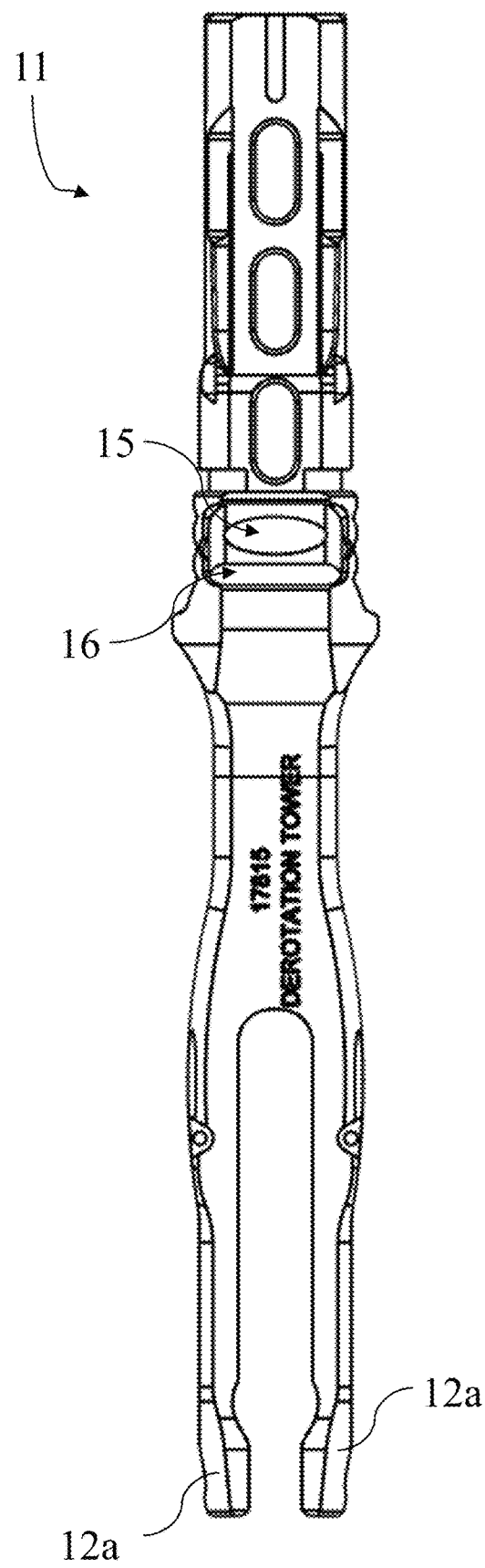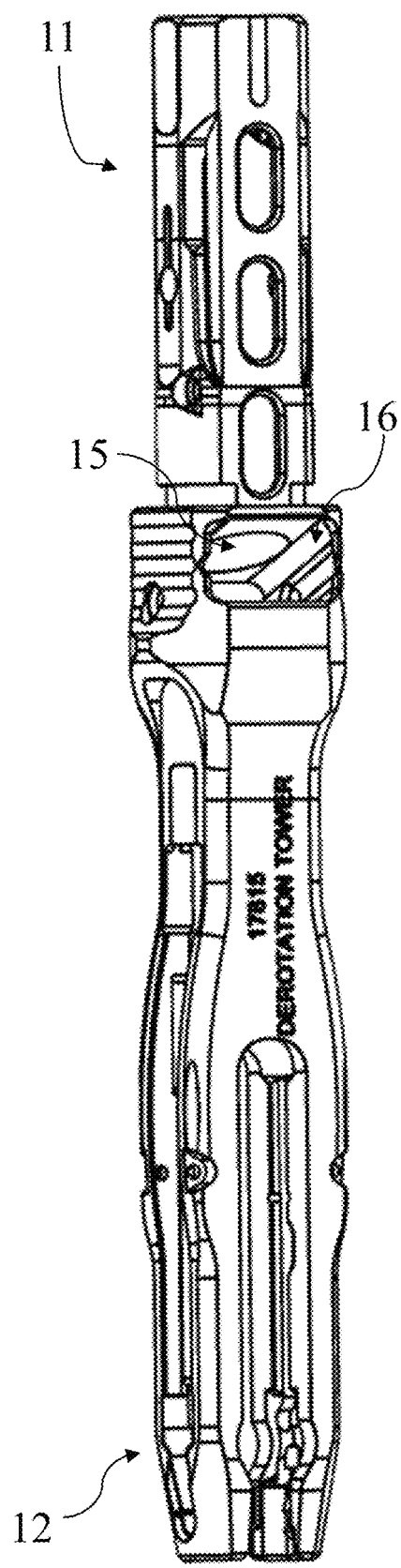
FIG. 3A
FIG. 3B

300

Inserting A Reducer Rod Into A Distal End Of The Longitudinal Bore Of The Elongated Housing To A First Position, 305

Pushing The Reducer Rod Into The Longitudinal Bore To A Second Position Such That The External Threads Of The Reducer Rod Are Disengaged By The Internally Threaded Portion Of An Insert, 310

Driving The Reducer Rod Into The Longitudinal Bore To A Third Position Such That The External Threads Of The Reducer Rod Are Engaged By The Internally Threaded Portion Of The Insert, 315

Driving A Drive Shaft Into The Reducer Rod Beyond A Distal End Of The Reducer Rod, 320

FIG. 29

ROD REDUCTION INSTRUMENT AND METHOD FOR SPINAL SURGERY

BACKGROUND

The present disclosure relates to rod reduction systems and methods of use thereof.

Current rod reduction systems generally require users to apply a large amount of force to properly utilize the rod reduction systems. For example, many rod reduction systems incorporate threaded zones allowing components of the system to be screwed together. However, users are often required to use a large amount of twisting force to engage components of the system with each other. This can lead to user fatigue up and down the entire arm—from the shoulder, through the elbow, to the wrist and hand. During surgical procedures, which can be exhausting for other reasons (length of the surgery, area of the body being operated on, amount of equipment used, etc.), it is undesirable for clinicians to become further fatigued through the required twisting force. Additionally, the required twisting force may be "handed," meaning individuals may not simply be able to switch out which hand they are exerting the twisting force with.

SUMMARY

The present disclosure relates to rod reduction instrument systems and methods of use thereof, particularly for use in spinal surgery. In various aspects, a rod reduction system includes an elongated housing having a longitudinal bore therethrough and a transverse channel extending through the elongated housing that is not perpendicular relative to the longitudinal bore. The elongated housing may also include an insert slideable within the transverse channel. The insert may be slideable between an outwardly displaced position and an inwardly biased position. Additionally, the insert includes a longitudinal bore therethrough, alignable with the longitudinal bore of the elongated housing, and a threaded portion. The rod reduction system may further include a reducer slidably receivable within the longitudinal bore of the elongated housing. The reducer may include a proximal end having a driver, a distal end, and a shaft extending from the proximal end to the distal end, where the shaft has a threaded portion. The rod reduction system may include (i) a first, rapid reduction position where the reducer displaces the insert to the outwardly displaced position such that the threaded portion of the insert does not engage the threaded portion of the shaft of the reducer, and (ii) a second, engaged position where the threaded portion of the insert in the inwardly biased position engages the threaded portion of the shaft of the reducer.

According to another aspect, a rod reduction system includes an inner shaft having a distal tip end and a threaded portion, and an elongated housing having a longitudinal bore therethrough to slidably receive the inner shaft. The elongated housing additionally has a transverse slot extending through the elongated housing at a predetermined angle relative to the longitudinal bore. Further, the elongated housing includes an actuator slideable within the transverse slot between an outwardly displaced position and an inwardly biased position. The actuator includes a longitudinal bore therethrough alignable with the longitudinal bore of the elongated housing and a threaded portion. The rod reduction system has a first mode and a second mode. The first mode may be a rapid reduction mode where the shaft displaces the actuator to the outwardly displaced position such that the threaded portion of the actuator does not engage the threaded portion of the shaft, allowing the shaft to bypass the threaded portion of the actuator. The second mode may be a driving mode, where the actuator is in the inward biased position such that the threaded portion of the actuator engages the threaded portion of the shaft.

According to another aspect, a method of using a rod reduction system may include positioning an insert within an elongated housing such that a longitudinal bore of the insert is aligned with a longitudinal bore of the elongated housing. Additionally, the method may include inserting a shaft into a proximal end of the longitudinal bore of the elongated housing to a first position and engaging external threads of the shaft by an internally threaded portion of the insert in the first position. The method may further include pushing the shaft into the longitudinal bore to a second position such that the external threads of the shaft are disengaged by the internally threaded portion of the insert. Still further, the method may include twisting the shaft to a third position within the longitudinal bore, the third position being different than the first position and the second position.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be better understood when read in conjunction with the following drawings wherein like structure is indicated with like reference numerals and in which:

FIG. 3A illustrates a front view of the elongated housing and FIG. 3B illustrates a partial side view of the elongated housing;

FIG. 29 illustrates a flowchart of an example method of using a rod reduction system of the present disclosure.

DETAILED DESCRIPTION

The present disclosure relates to rod reduction systems for use in spinal surgeries, such as between a first and second vertebral bone.

Figure 1:
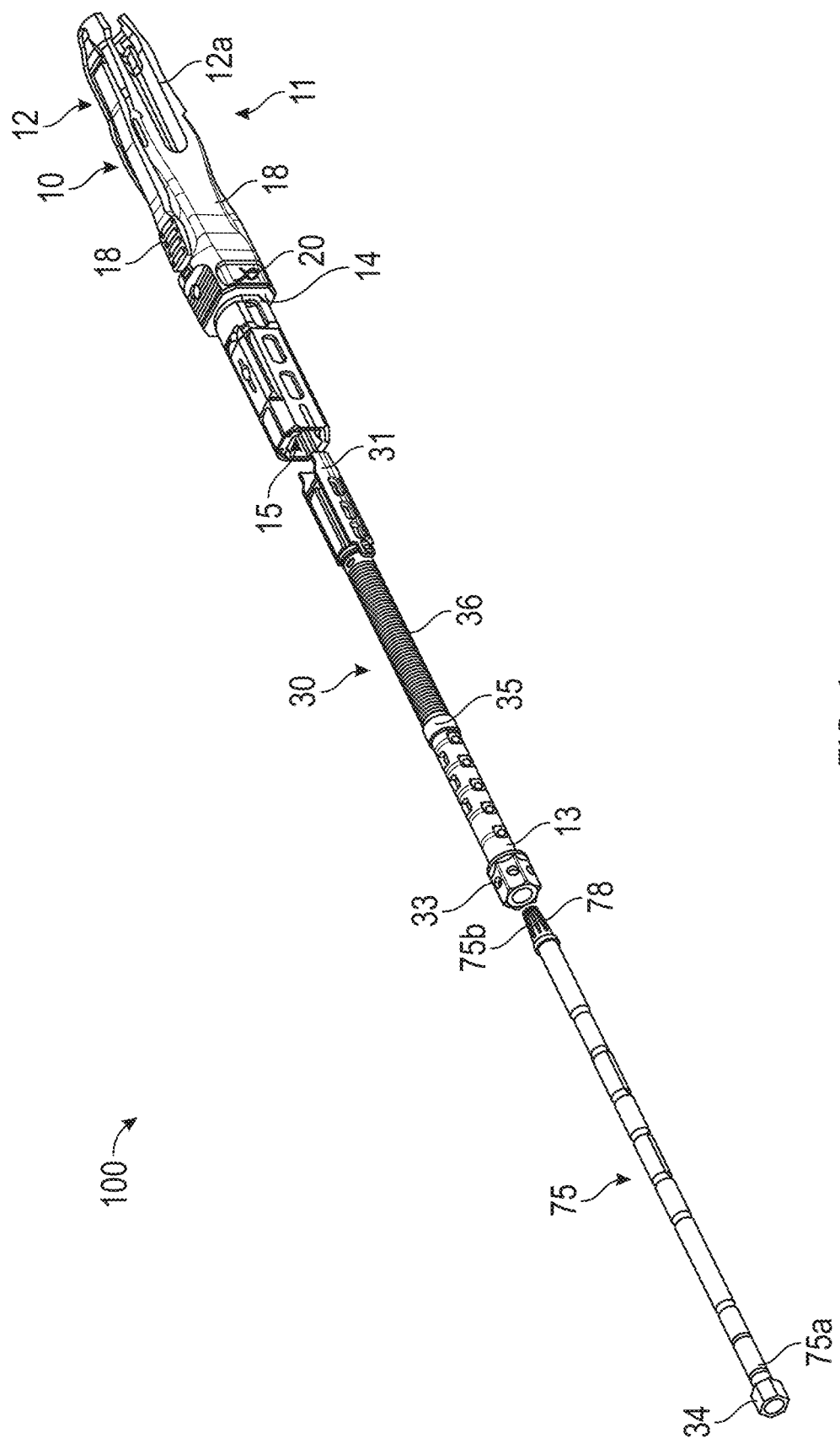
FIG. 1 is an exploded perspective view of a first system having an elongated housing assembly and a reducer rod.

FIG. 1 is an exploded perspective view of a first system 100 having an elongated housing assembly 10 and a reducer rod, rod reducer or inner shaft 30. The elongated housing assembly 10 includes an elongated housing 11 and an insert 20 received within a portion of the elongated housing 11. The elongated housing 11 includes a distal end 12, which may have a first set of distal arms 12a, a proximal end 13, and a body 14 extending therebetween. The elongated housing 11 may also include a second set of arms 18 that are engaged or received by the body 14. The elongated housing 11 and/or the body 14 defines a longitudinal bore or channel 15 (which may correspond to a longitudinal axis of the elongated housing 11) extending from the distal end 1213 to the proximal end 1312. The proximal end 13 of the elongated housing may correspond to the proximal end of the longitudinal bore 15. Likewise, the distal end 12 may correspond to the distal end of the longitudinal bore 15.

Figure 2A:
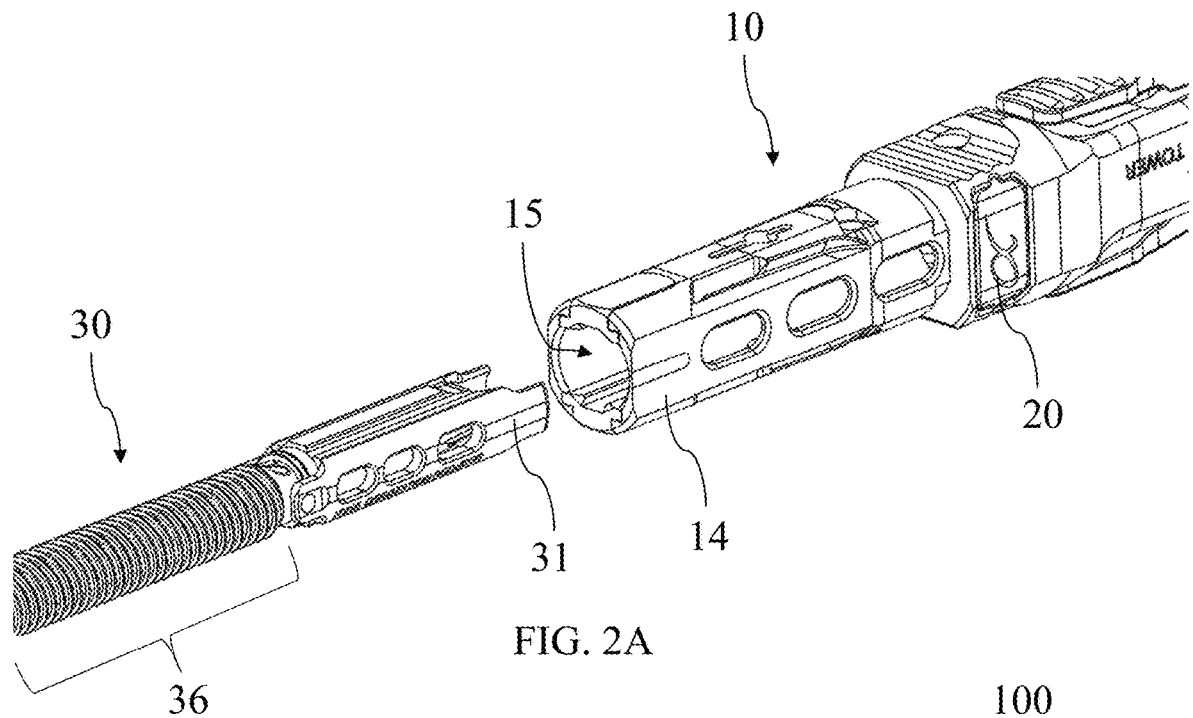
FIG. 2A is a first close-up view of a proximal end of the reducer rod and a distal end of the elongated housing assembly.

The reducer rod or inner shaft 30 may include a distal end 31, a proximal end defined by a proximal engagement mechanism 33, and a body 35 extending therebetween. Contained within shaft 30 is a drive shaft having a proximal end 75a extending beyond the proximal end of shaft 30. The longitudinal bore 15 may be for receiving at least a portion of the reducer rod 30 (also referred to herein as "an inner shaft"). Specifically, referring the FIGS. 2A and 2B, the distal end 31 of the reducer rod 30 may be aligned and positioned within the proximal end 13 of the elongated housing 11 and the longitudinal bore 15. As described elsewhere, the insert 20 of the housing 11 also includes a longitudinal bore 24 that aligns with the longitudinal bore 15 of the housing 11. Thus, when the reducer rod 30 is received in the longitudinal bore 15 of the elongated housing 11, the reducer rod 30 is similarly received in the longitudinal bore 24 of the insert.

Figure 2B:
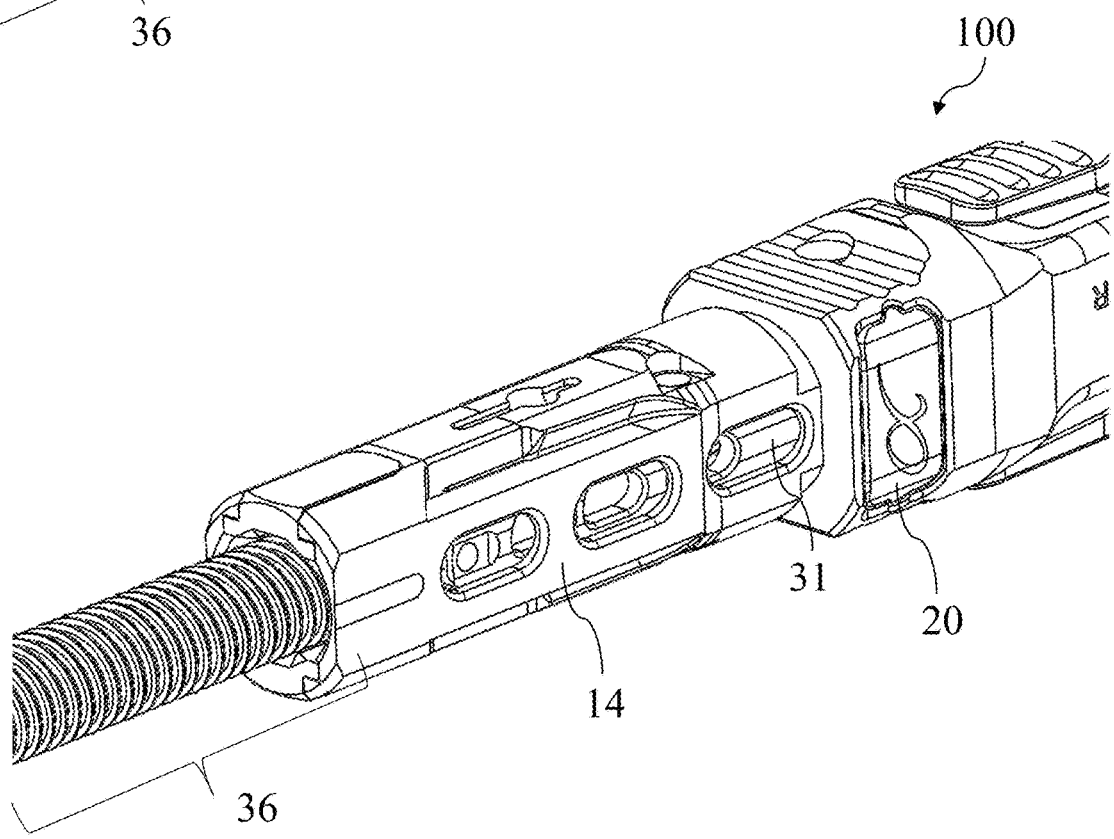
FIG. 2B is a second close-up view where the proximal end of the reducer rod is received within the distal end of the elongated housing.
Figure 4A:
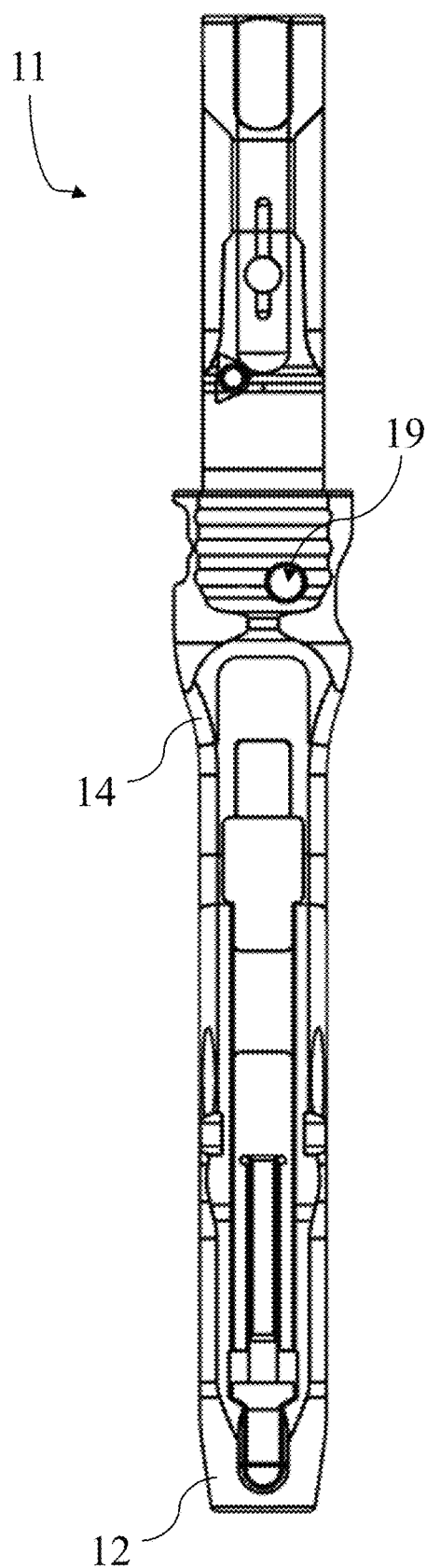
FIG. 4A illustrates a side view of the elongated housing of FIG. 3A
Figure 4B:
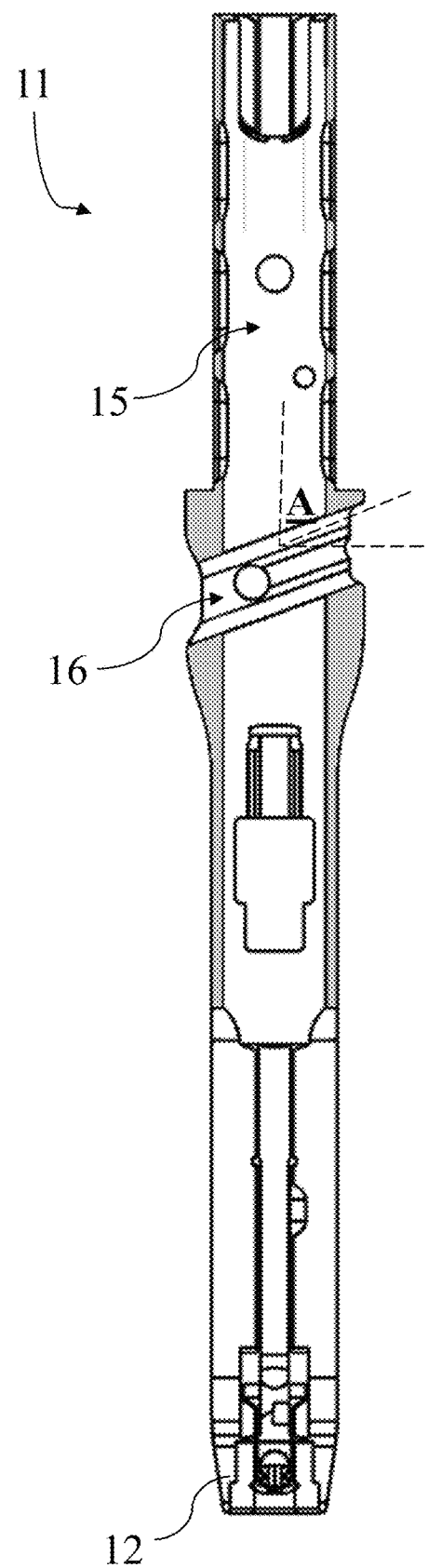
FIG. 4B illustrates a cross-sectional view of FIG. 4A.
Figure 5A:
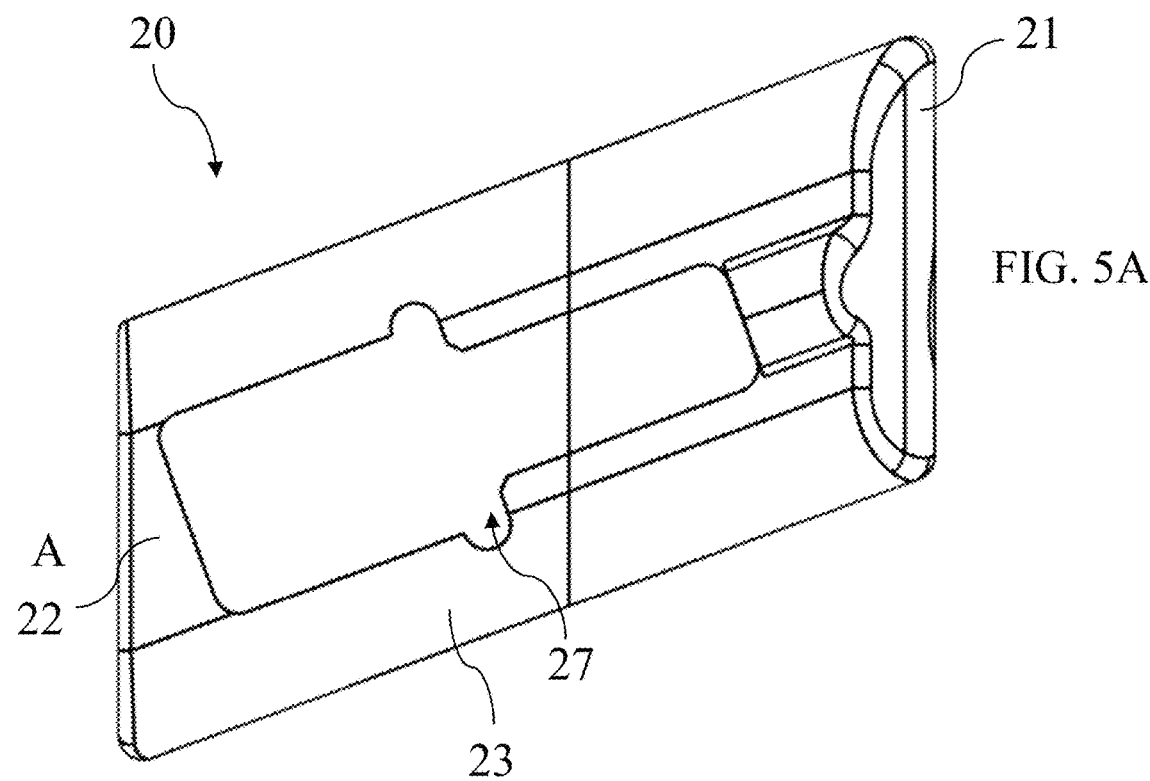
FIG. 5A illustrates a side view of an insert from the elongated housing assembly of FIG. 1
Figure 5B:
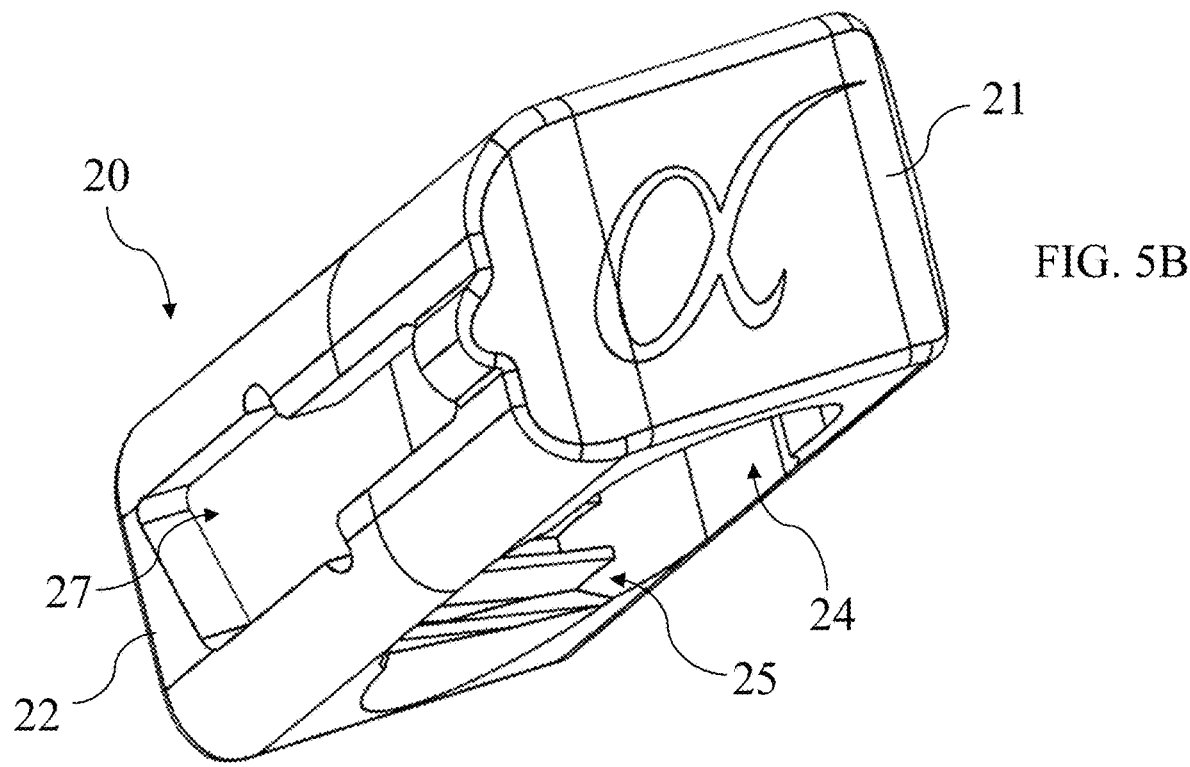
FIG. 5B illustrates a front side perspective view of the insert.
Figure 6A:
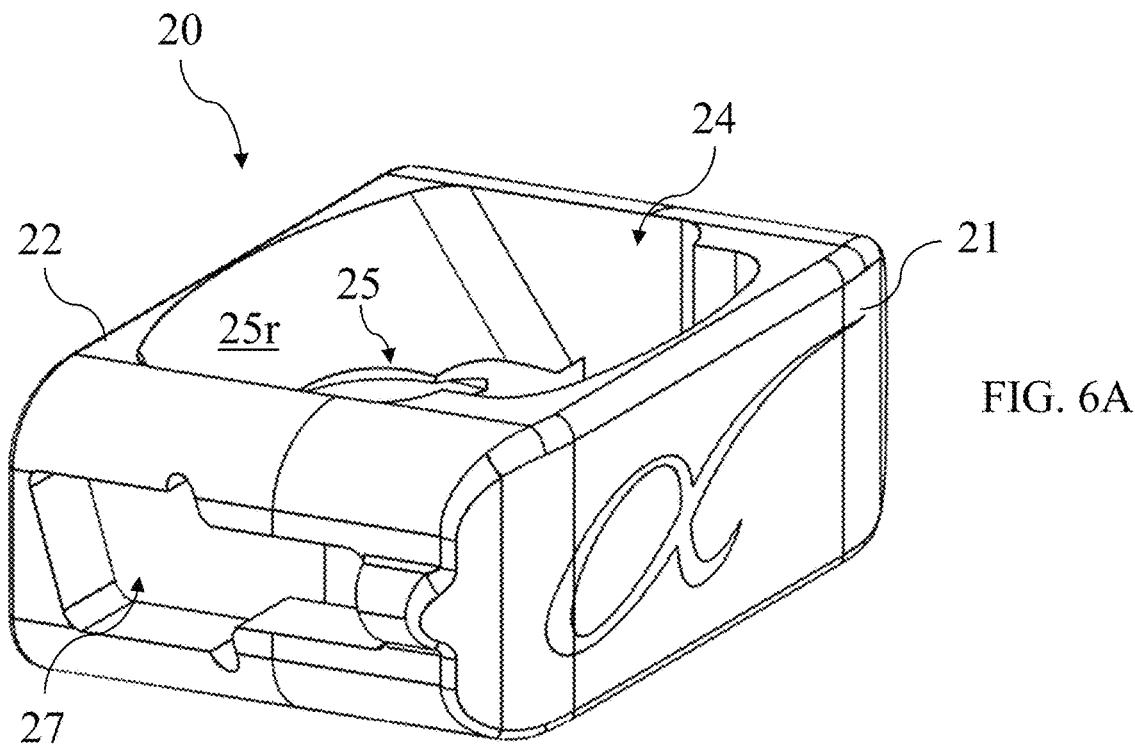
FIGS. 6A and 6B illustrate front top perspective views of the insert of FIGS. 5A-5B.
Figure 6B:
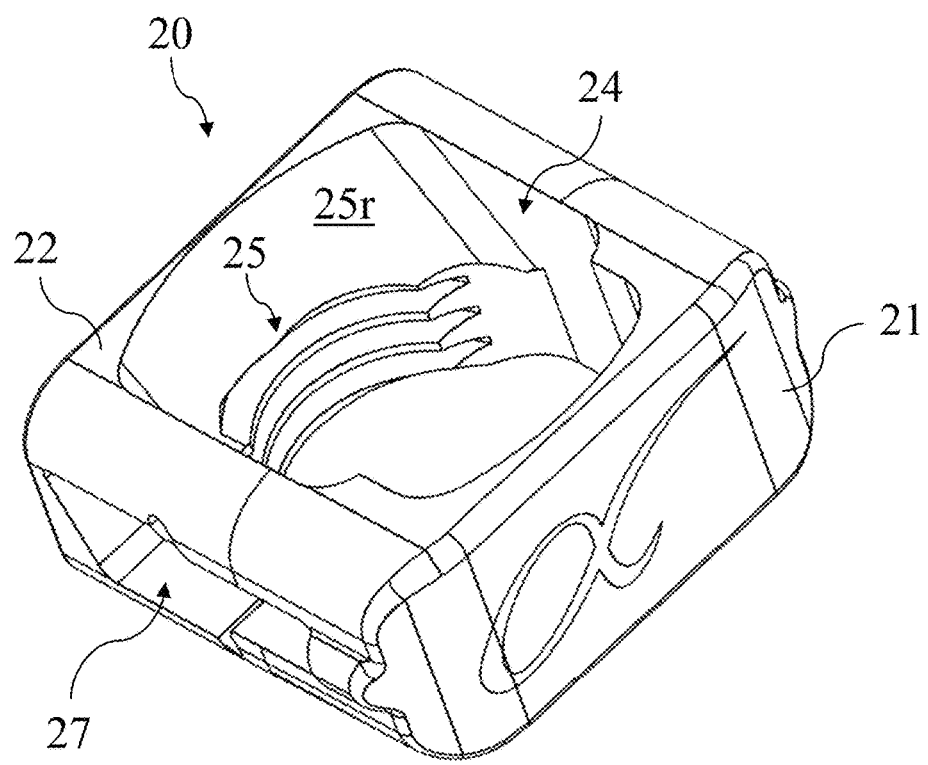

FIGS. 3A through 4B illustrate various views of the elongated housing 11 from the elongated housing assembly 10 of FIGS. 1 through 2B. Specifically, FIG. 3A illustrates a front view of the elongated housing 11, FIG. 3B illustrates a partial side view of the elongated housing 11, FIG. 4A illustrates a side view of the elongated housing 11 of FIG. 3A, and FIG. 4B illustrates a cross-sectional view of FIG. 4A. As before, the elongated housing includes a distal end 12, which may include distal arms 12a, a proximal end 13, and a body 14 extending between the distal end 12 and the proximal end 13. The elongated housing 11 and/or the body 14 defines a longitudinal bore or channel 15 that extends from the distal end 12 (e.g., the space between the arms 12a) and the proximal end 13.

Extending transverse or crosswise through the longitudinal bore 15 and the elongated housing 11 is an opening or slot 16 (referred to herein as "the opening," "the transverse opening," and/or "the transverse slot"). The transverse opening may have a non-perpendicular angle relative to the longitudinal bore. As seen most clearly in FIGS. 3B and 4B, the transverse opening 16 crosses the longitudinal bore 15 at a non-perpendicular angle relative to the longitudinal bore 15 and the elongated housing 11. The transverse opening 16 may cross the longitudinal bore 15 at an angle A ranging from at least about 20° to about 80°, from at least about 10° to about 60°, from at least about 50° to about 85°, from at least about 40° to about 75°, and/or from at least about 60° to about 75°, relative to the longitudinal bore 15 (and the body 14 of the elongated housing 11). For example, the angle A may be about 25°, 40°, 55°, 65°, 70°, or an angle within a range defined by any two of the foregoing values. The transverse opening 16 receives the insert 20. The transverse opening 16 may define one or more voids 19 for receiving a portion of the spring-loaded mechanism 60 of the insert 20. In other configurations, the transverse opening 16 may have a 90 degree angle relative to longitudinal bore 15 (i.e., may be a standard slot running crosswise through the longitudinal bore).

Figure 12:
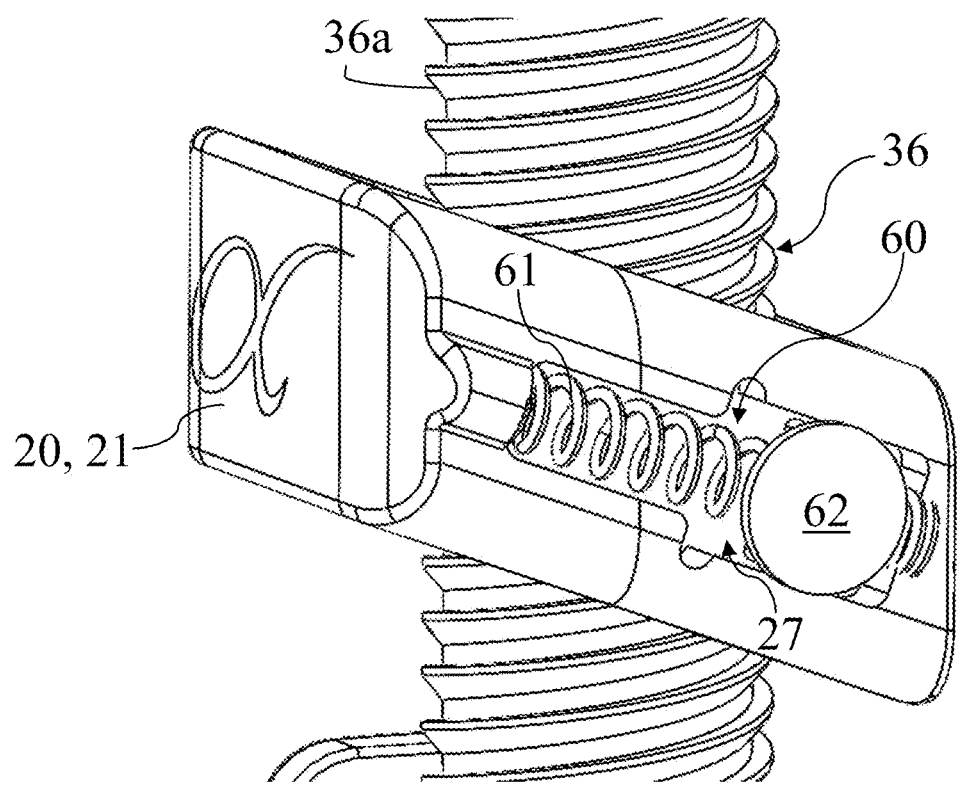
FIG. 12 illustrates a side view of the insert engaging the threaded shaft portion of the reducer rod.

FIGS. 5A through 7B illustrate various views of the insert 20 that is received within the transverse opening 16. Referring to FIGS. 5A through 6B, the insert 20 includes a body 23 having a front end 21 and a back end 22. Defined within at least one side surface of the body 23 may be a groove 27 for receiving a spring-loaded mechanism 60 (FIG. 12). The spring-loaded mechanism 60 biases the insert 20 within the transverse opening 16 in an inwardly biased position. The body 23 also defines a longitudinal bore 24 extending through the body 23. The longitudinal bore 24 includes an internally threaded portion 25 for engaging with external threads 37 of the reducer rod 30 (see FIG. 8) and a non-threaded portion 26 opposite the internally threaded portion 25. The internally threaded portion 25 may also include a ramped portion 25r (which may also correspond to a thread 28 of the threaded portion 25) for guiding the distal end 31 of the reducer rod 30 into and through the insert 20.

Figure 7A:
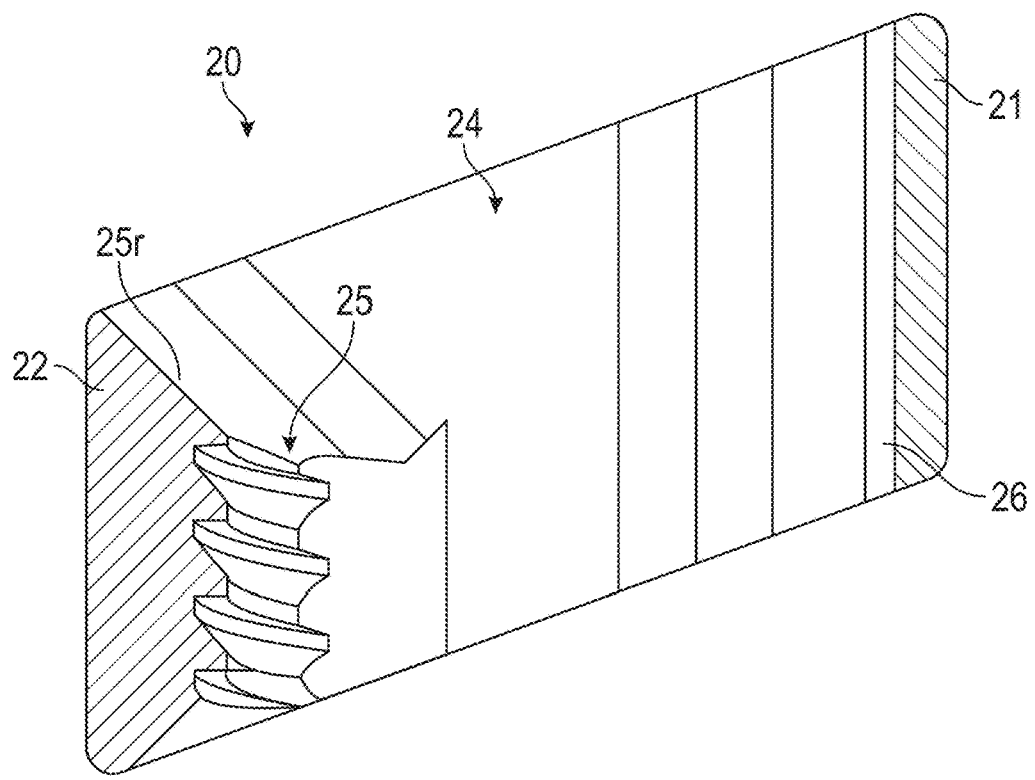
FIG. 7A illustrates a cross-sectional view of the insert of FIG. 5A
Figure 7B:
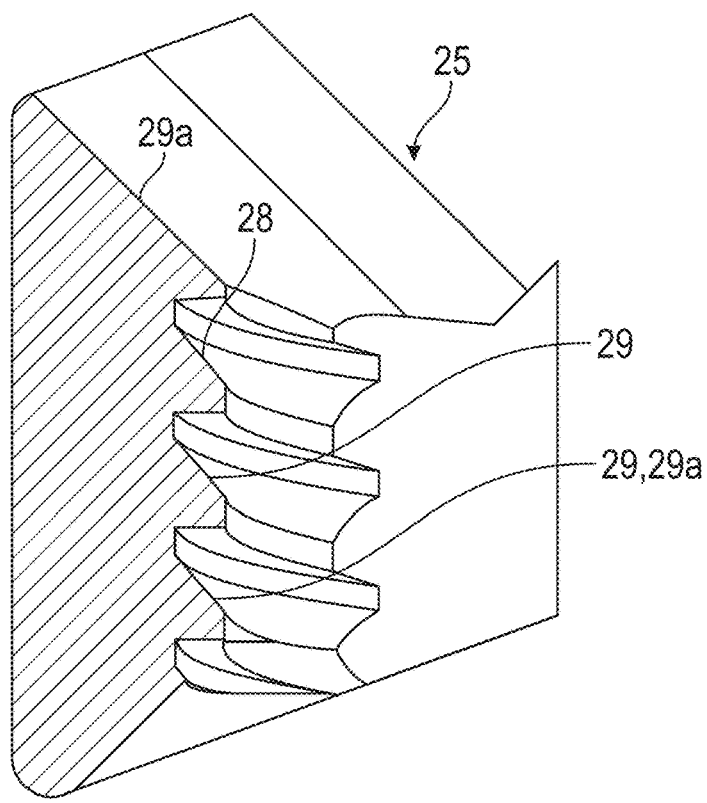
FIG. 7B illustrates a close-up view of a threaded portion of the insert.

Referring to FIGS. 7A and 7B, the internally threaded portion 25 includes a plurality of threads 28, which may be buttress threads. Each individual thread 28 includes a ramped undercut portion 29, which may be ramped at an angle 29a. The angle 29a corresponds to a ramped undercut 39 of threads 37 of the reducer rod 30 having an angle 37a (see FIG. 8). The angle 29a may range from about 30° to about 45°, such as 35°, 40°, 42°, or an angle within a range defined by any two of the foregoing values. Correspondingly, the angle 37a of the threads 37 may range from about 30° to about 45°, such as 35°, 40°, 42°, or an angle within a range defined by any two of the foregoing values. The ramped undercut 29 of each thread 28 facilitates a ratchet-type motion between the threaded portion 36 of the reducer rod 30 and the threaded portion 25 of the insert 20. In other configurations, other angles and threading types can also be used.

Figure 8:
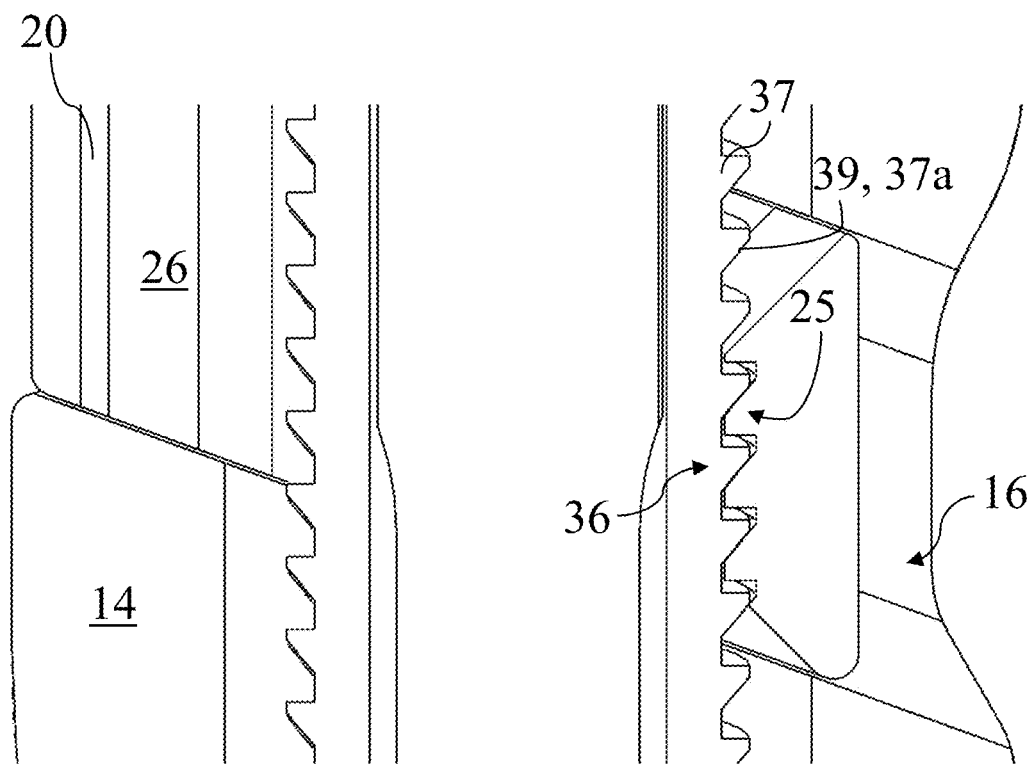
FIG. 8 illustrates a cross-sectional view of the threaded shaft portion of the reducer rod within the insert and just before disengaging the threaded portion of the insert.
Figure 9:
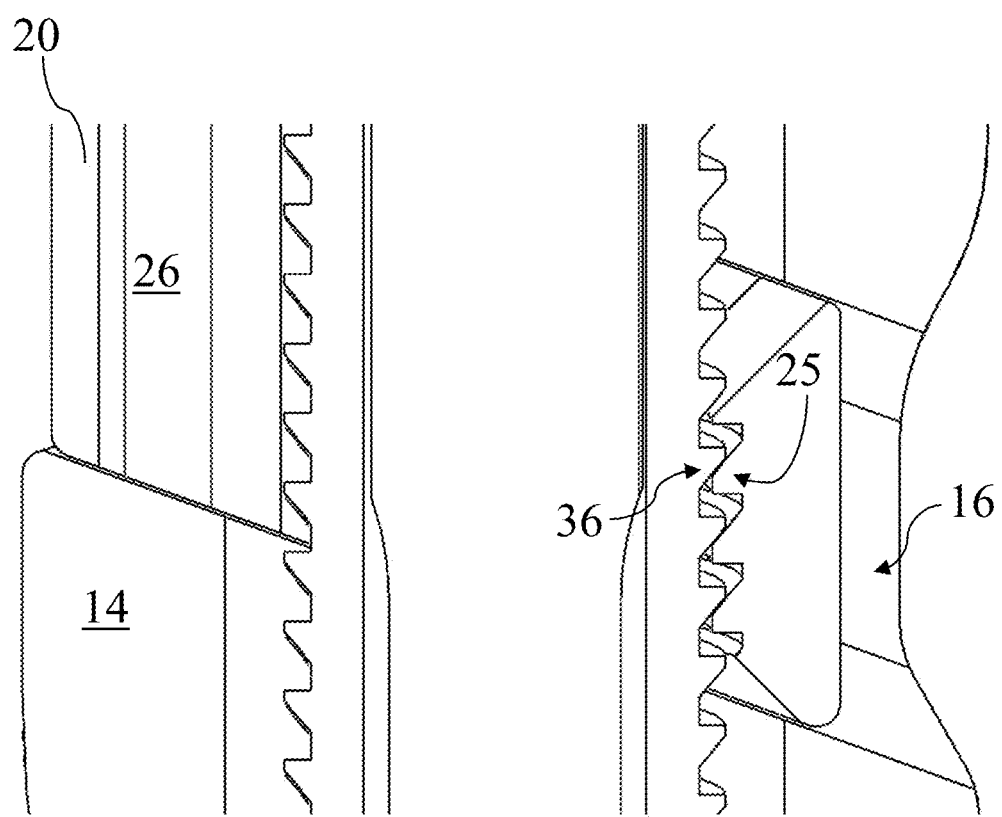
FIG. 9 illustrates a cross-sectional view of the threaded shaft portion of the reducer rod within the insert and just before fully disengaging the threaded portion of the insert.
Figure 10:
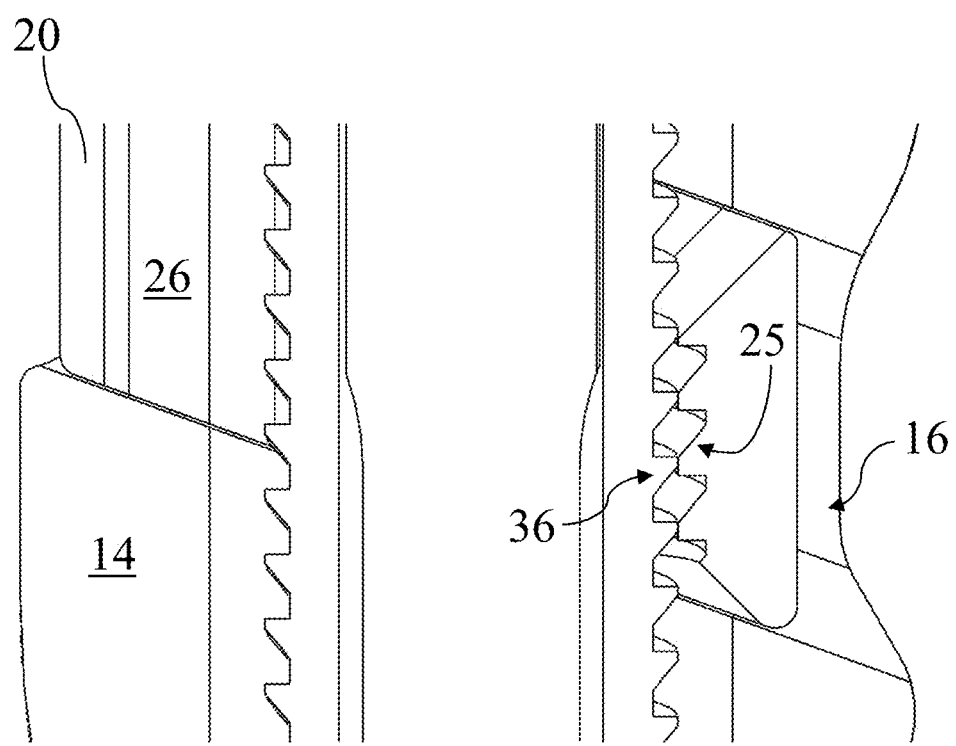
FIG. 10 illustrates a cross-sectional view of the threaded shaft portion of the reducer rod within the insert with the threads disengaged allowing for translation of the threaded shaft portion of the rod reducer.

Referring to FIGS. 8 to 10, when the reducer rod 30 is introduced into the longitudinal bore 15 of the housing 11 and the longitudinal bore 24 of the insert 20 of the housing, the threaded portion 36 of the reducer rod 30 comes into contact with the threaded portion 25 of the insert 20. A user of the rod reduction system 100 can twist the reducer rod 30 to engage the threaded portion 25 of the insert 20 and move the reducer rod 30 through the elongated housing 11 and the insert 20. Alternatively, the user can continue to apply force to the reducer rod 30 and engage a bypass or ratchet-type movement between the threaded portion 36 of the reducer rod 30 and the threaded portion 25 of the insert 20. Specifically, the ramped undercut 39 of the threads 37 will slide against ramped undercut 29 of the threads 28, allowing the reducer rod 30 to move within and through the elongated housing 11 and the insert 20. This bypass or ratchet motion can continue until the distal end 31 of the reducer rod 30 hits a stopping point, at which point a driver handle or other tool can be used to twist the reducer rod 30 to engage the threaded portion 25 of the insert 20 and move the reducer rod 30 through the elongated housing 11 and the insert 20.

Figure 11:
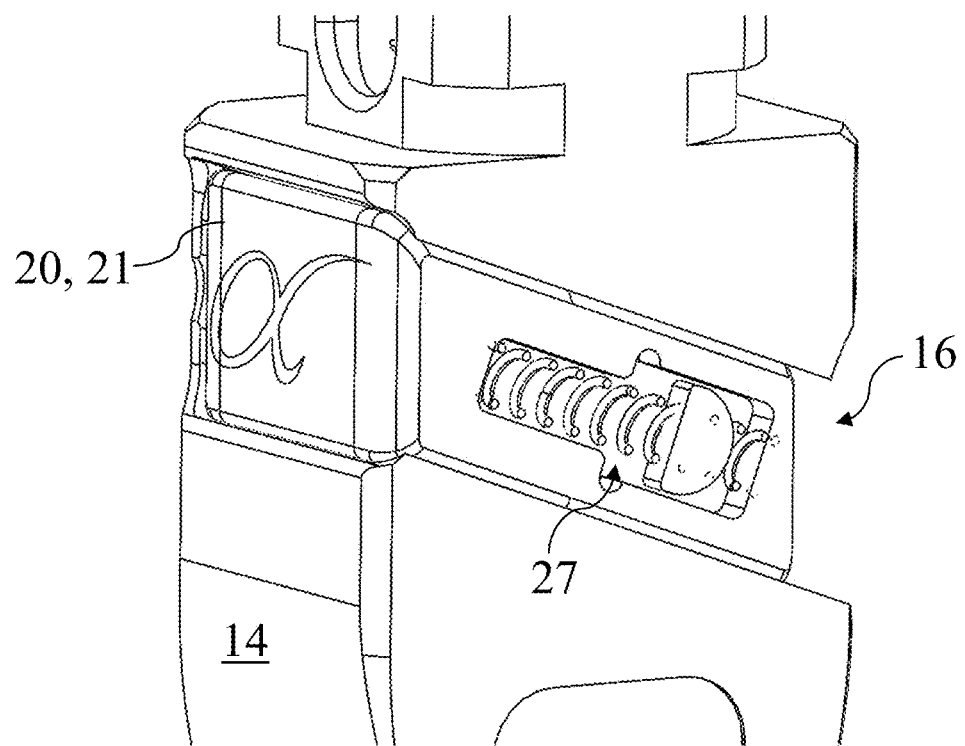
FIG. 11 illustrates a side, partial cross-sectional view of the insert having a spring-loaded mechanism and positioned within a portion of the elongated housing.

FIGS. 11 and 12 illustrate the spring-loaded mechanism 60 of the insert 20 received within the groove 27. The spring-loaded mechanism 60 includes a spring 61 and a rapid release tab 62 for rapid releasing the reducer rod 30 from the elongated housing 11. The rapid release tab 62 is received by and extends through the void 19 defined within the transverse opening 16 (see FIGS. 4A and 4B). As discussed, the spring-loaded mechanism 61 biases the insert 20 toward the inwardly biased position within the transverse opening 16. When the insert 20 is displaced to the outwardly displaced position, the spring-loaded mechanism acts to automatically retract the insert 20 back to the inwardly biased position when an outward displacement force has been removed from the insert 20. When it is desirable to remove the reducer rod 30 from the elongated housing assembly 10, the tab 62 can be pressed which will cause the insert 20 to be moved to the outwardly displaced position and disengage the internally threaded portion 25 from the externally threaded portion 36. With the threads 28, 37 disengaged from each other, the reducer rod 30 can be pulled from the proximal end 13 of the elongated housing 11, thereby removing the reducer rod 30 from the elongated housing 11.

Figure 13:
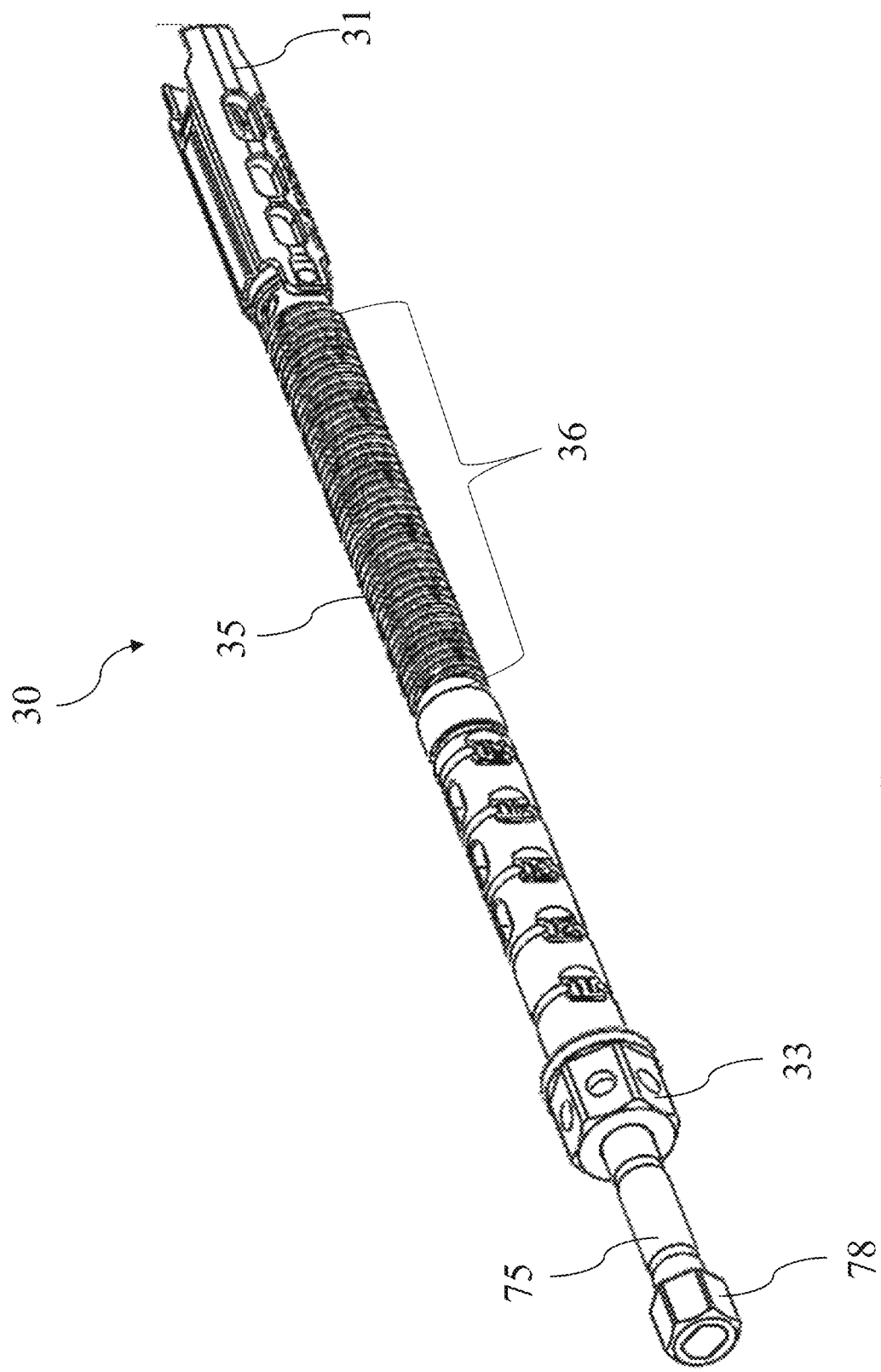
FIG. 13 illustrates a perspective view of the reducer rod of FIG. 1.

FIG. 13 illustrates a perspective view of the reducer rod 30 of FIG. 1. As before, the reducer rod 30 includes the distal end 31, the engagement mechanism 33, and the body 35 extending therebetween. The body 35 includes an externally threaded portion 36 positioned between the distal end 31 and the engagement mechanism 33. The proximal end 13 of the reducer rod 30 may be a handle engagement end having a first, larger engagement mechanism 33 and, extending beyond the proximal end of the rod reducer 30 is the proximal end of drive shaft 75, which is a second, smaller engagement mechanism 34. The first, larger engagement mechanism 33 and the second, smaller engagement mechanism may each be a nut or another appropriate engagement mechanism for, for example, a handle. Any suitable engagement mechanism desired can be used. The distal end 31 of the reducer rod 30 may be insertable into the proximal end 13 of the elongated housing 11 and, depending on a position of the reducer rod 30 within the elongated housing 11, may be received by the longitudinal bore 15 at the distal end 12 of the elongated housing 11. The body 35 may be fully or partially received within the longitudinal bore 15 of the elongated housing 11, depending on the position of the reducer rod 30 within the elongated housing 11.

Figure 14A:
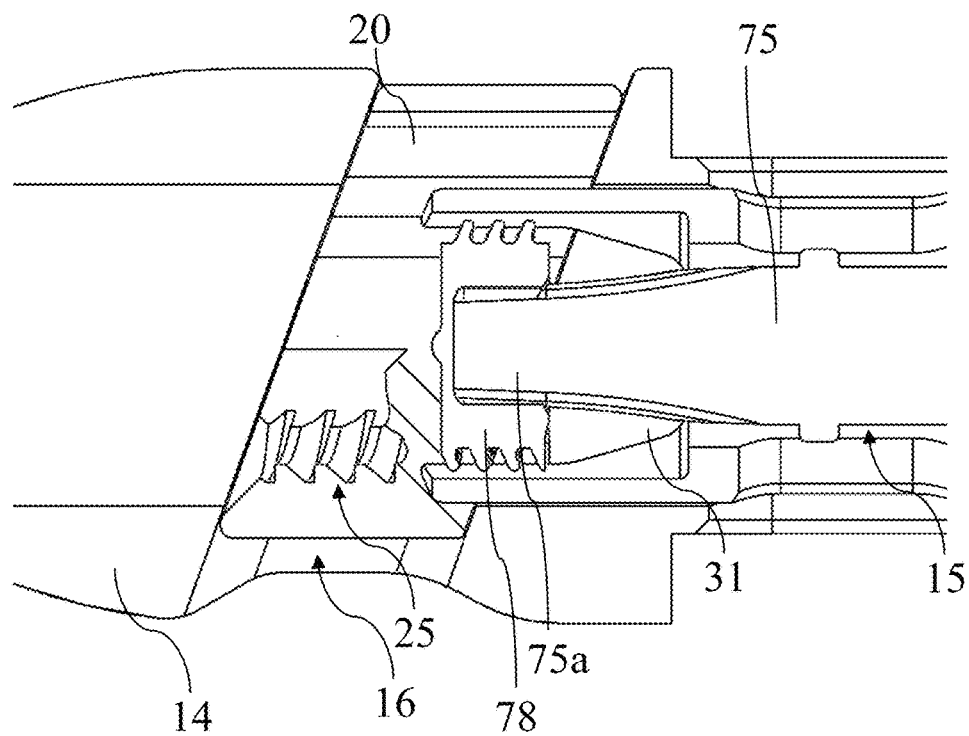
FIG. 14A illustrates a cross-sectional view of the proximal end of the reducer rod going through the insert of the elongated housing assembly and FIG. 14B illustrates a cross-sectional view of the threaded portion of the insert engaging with a threaded shaft of the reducer rod.
Figure 14B:
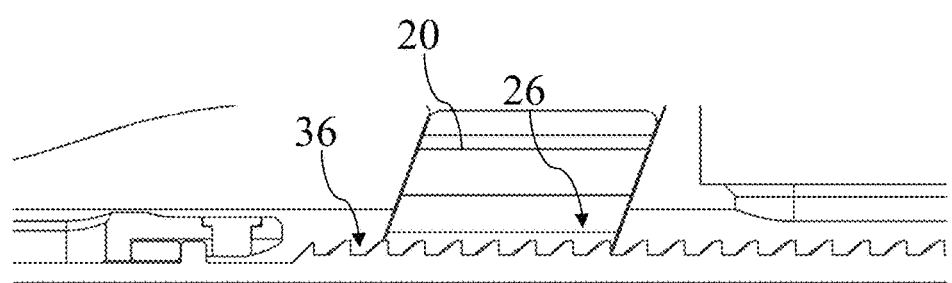
Figure 14B:
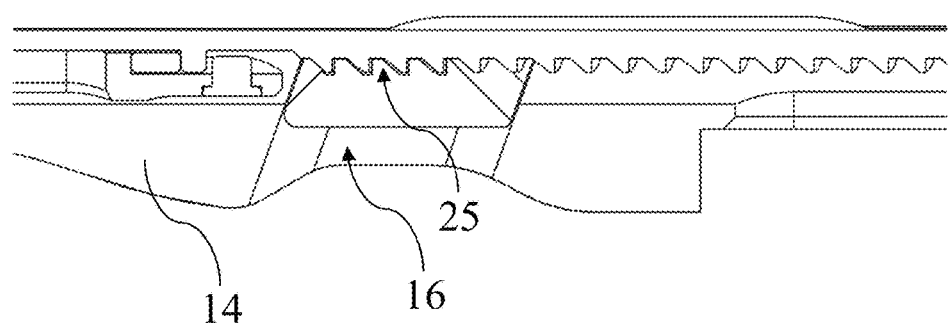

FIG. 14A illustrates the distal end 31 of the reducer rod 30 going through the insert 20 of the elongated housing assembly 10 and FIG. 14B illustrates the threaded portion 25 of the insert 20 engaging with the threaded portion 36 of the reducer rod 30. Also shown in these figures is the drive shaft 75 contained within reducer rod 30. FIG. 14A further illustrates the distal end 75b of drive shaft 75 to which is removably secured a set screw 78. As before, the distal end 31 of the reducer rod 30 is insertable into the proximal end 13 of the elongated housing 11. The reducer rod 30 may be further inserted into the elongated housing 11, such that the distal end 31 passes into and through the longitudinal bore 24 of the insert 20, as seen in FIG. 14A. Inserting the distal end 31 through the longitudinal bore 24 of the insert 20 causes the insert 20 to move or slide within the transverse opening 16 of the elongated housing 11. Specifically, the insert 20 slides from an inwardly biased position (where the insert 20 is fully seated and received within the transverse opening 16) to an outwardly displaced position relative to the longitudinal bore 15, where the insert 20 is not fully seated and received within the transverse opening 16. The spring-loaded mechanism 60 biases the insert 20 in the inwardly biased position, keeping the insert 20 seated and received within the transverse opening 16 until action by the reducer rod 30.

As the reducer rod 30 is still further inserted into the elongated housing 11, the threaded portion 36 of the reducer rod 30 will also pass into and through the longitudinal bore 24 of the insert 20, as seen in FIG. 14B. As described, the threads 37 of the threaded portion 36 can ratchet past the threads 28 of the internally threaded portion 25 of the insert 20. With the insert 20 in the outwardly displaced position, the threads 28 are easier to ratchet past by the threads 37. When the reducer rod 30 is no longer forced through and into the elongated housing 11, the spring-loaded mechanism 60 of the insert 20 will cause the insert to "snap back" into the inwardly biased position, such that the threads 28 of the internally threaded portion 25 engage the threads 37 of the externally threaded portion 36 of the reducer rod 30.

Figure 15:
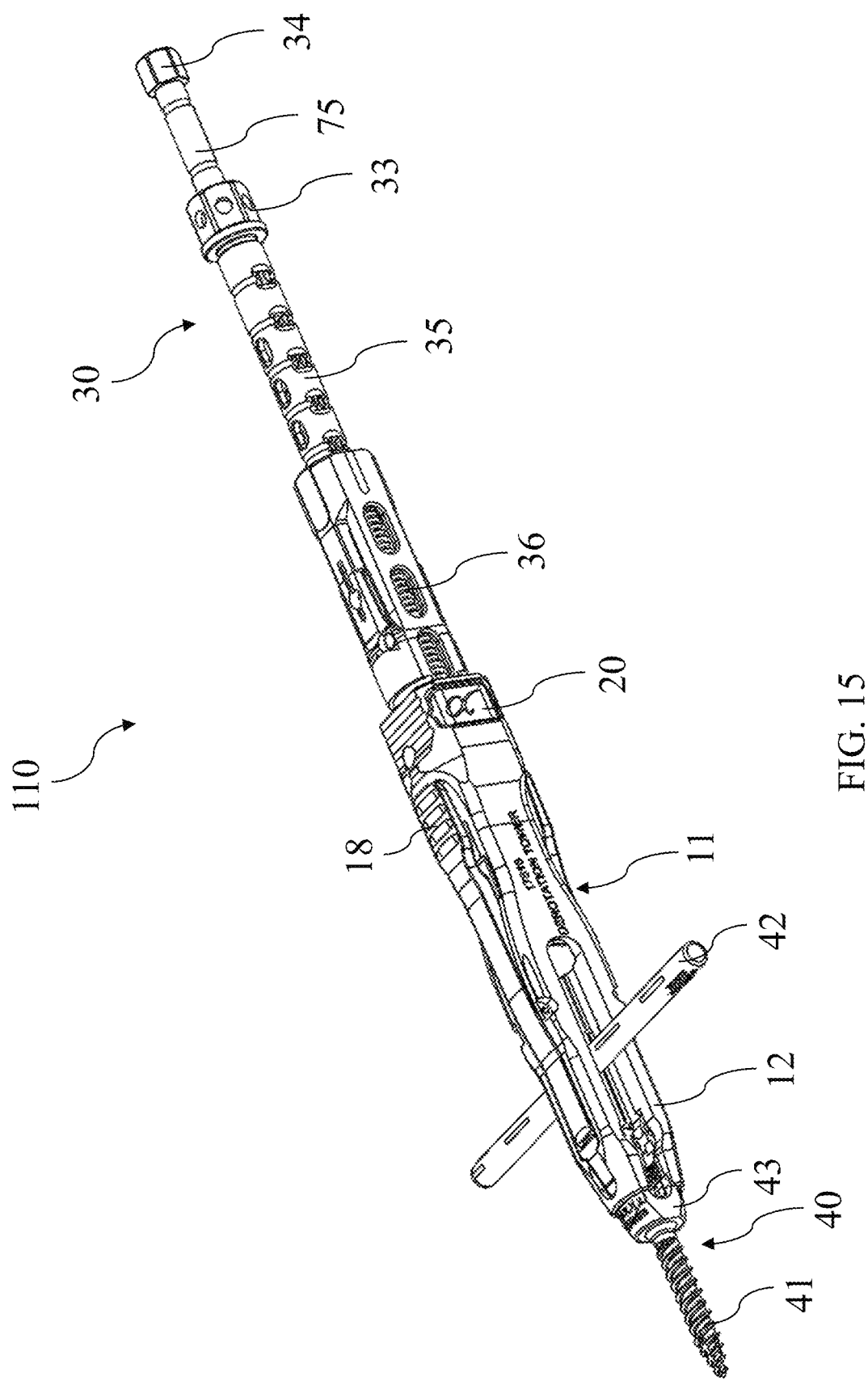
FIG. 15 illustrates a perspective view of a second system having the elongated housing assembly, the reducer rod, and a tulip assembly.

Turning now to FIG. 15, a perspective view of a second system 110 is shown. This second system has an elongated housing assembly 10, a reducer rod 30, and a tulip assembly 40. Similar to the system 100 of FIGS. 1-14B, the elongated housing assembly 10 includes the elongated housing 11 and the insert 20 slidably received within a portion (e.g., the transverse opening 16) of the elongated housing 11. The reducer rod 30 includes the distal end 31, the externally threaded portion 36 (both illustrated as received within the elongated housing 11), and the first driver engagement mechanism 33. Attached to the distal end 12 of the elongated housing 11 is a tulip assembly 40, which includes a screw 41, a rod 42, and a housing 43 configured to engage the distal end 12.

Figure 16:
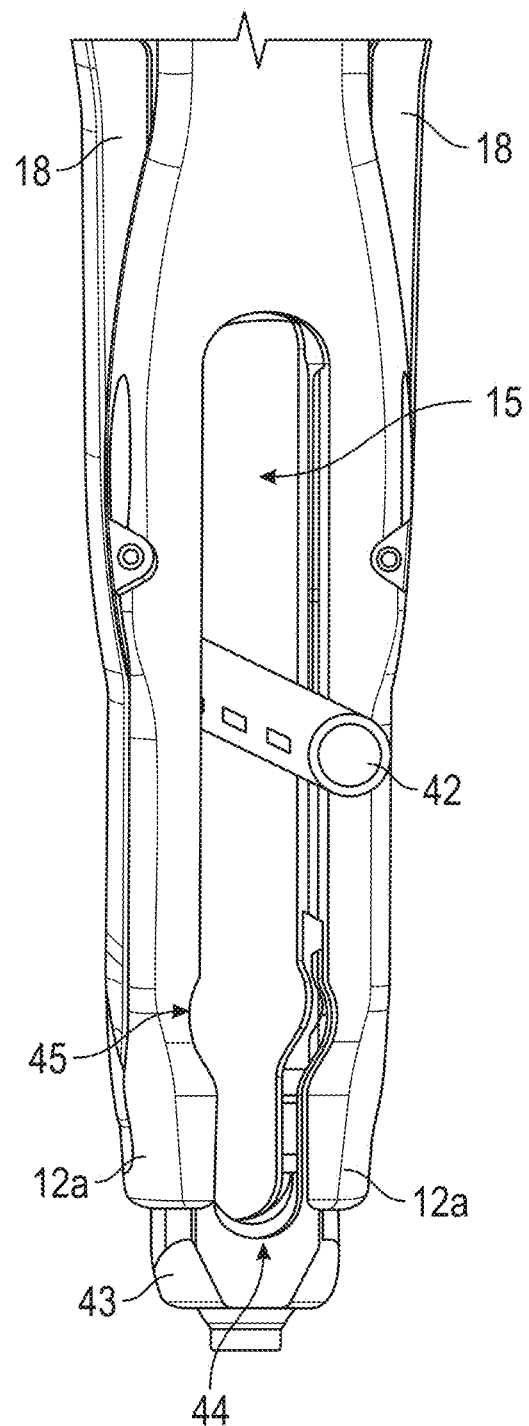
FIG. 16 illustrates a first close-up view of a proximal end of the elongated housing and a portion of the tulip assembly.

FIG. 16 illustrates a first close-up view of the distal end 12 of the elongated housing 11 and a portion of the tulip assembly 40. As illustrated, the housing 43 of the tulip assembly 40 can be grasped or otherwise attached to the elongated housing 11 by the arms 12a of the distal end 12. Also visible are the second set of arms 18 that may facilitate grasping and release of the housing 43 by the distal end 12 of the elongated housing 11. Each distal arm 12a may include or define a cut-out 45 for receiving and guiding the rod 42 to the housing 43 and, more specifically, to a groove 44 within the housing 43. Each of the cut-outs 45 and the groove 44 are shaped and sized to correspond to a diameter or size of the rod 42. As the distal end 31 of the reducer rod 30 moves through the longitudinal bore 15 of the elongated housing 11, a position of the rod 42 within the longitudinal bore 15 will change.

Figure 17A:
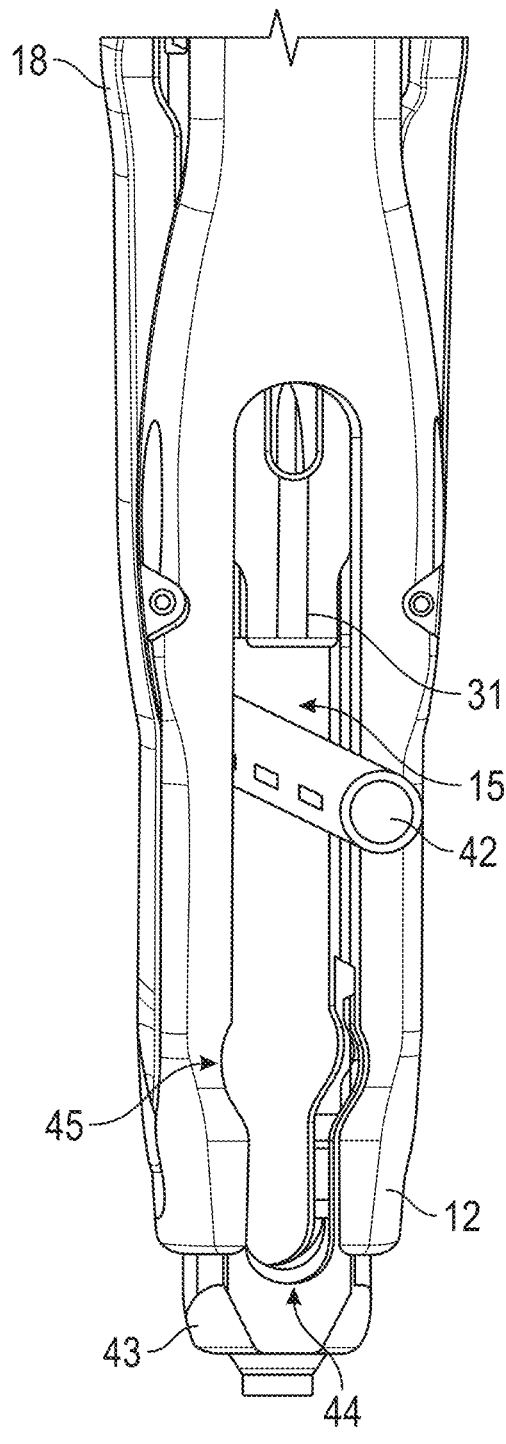
FIG. 17A illustrates a second close-up view of the proximal end of the elongated housing and a portion of the tulip assembly.
Figure 17B:
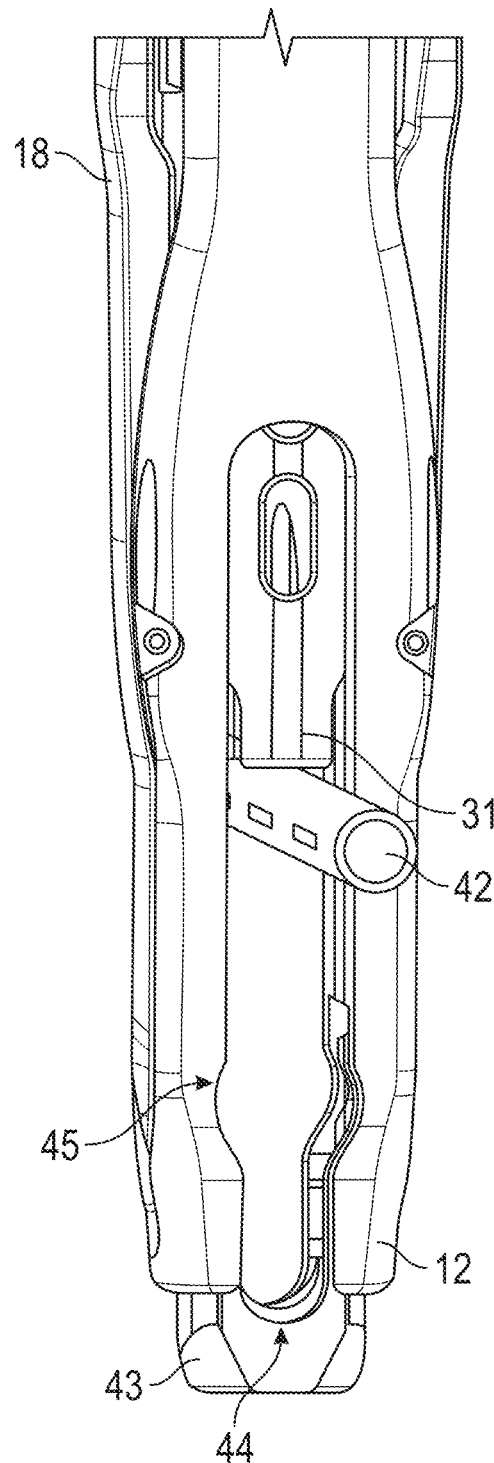
FIG. 17B illustrates a third close-up view of the proximal end of the elongated housing and the portion of the tulip assembly.

Specifically, the rod 42 will be advanced to the groove 44 of the housing 43 of the tulip assembly 40. FIG. 17A illustrates a second close-up view of the distal end 12 of the elongated housing 11 and the rod 42, and FIG. 17B illustrates a third close-up view of the distal end 12 of the elongated housing 11 and the rod 42. Visible in FIG. 17A is the distal end 31 of the reducer rod 30 extending into the longitudinal bore 15 just distal of the rod 42. As the reducer rod 30 is further advanced into the longitudinal bore 15, the distal end 31 will come into contact with the rod 42. In some embodiments, when the distal end 31 contacts the rod 42, axial translation of the reducer rod 30 will be stopped; that is, the reducer rod 30 can no longer be forced through the elongated housing 11 via the ratchet or bypass motion and a driver handle or other tool may need to be engaged for further proximal movement of the reducer rod 30 and the rod 42. In some embodiments, when the distal end 31 contacts the rod 42, the reducer rod 30 may be further translated axially until the rode 42 is forced distally at least partially into the housing 43.

Figure 18:
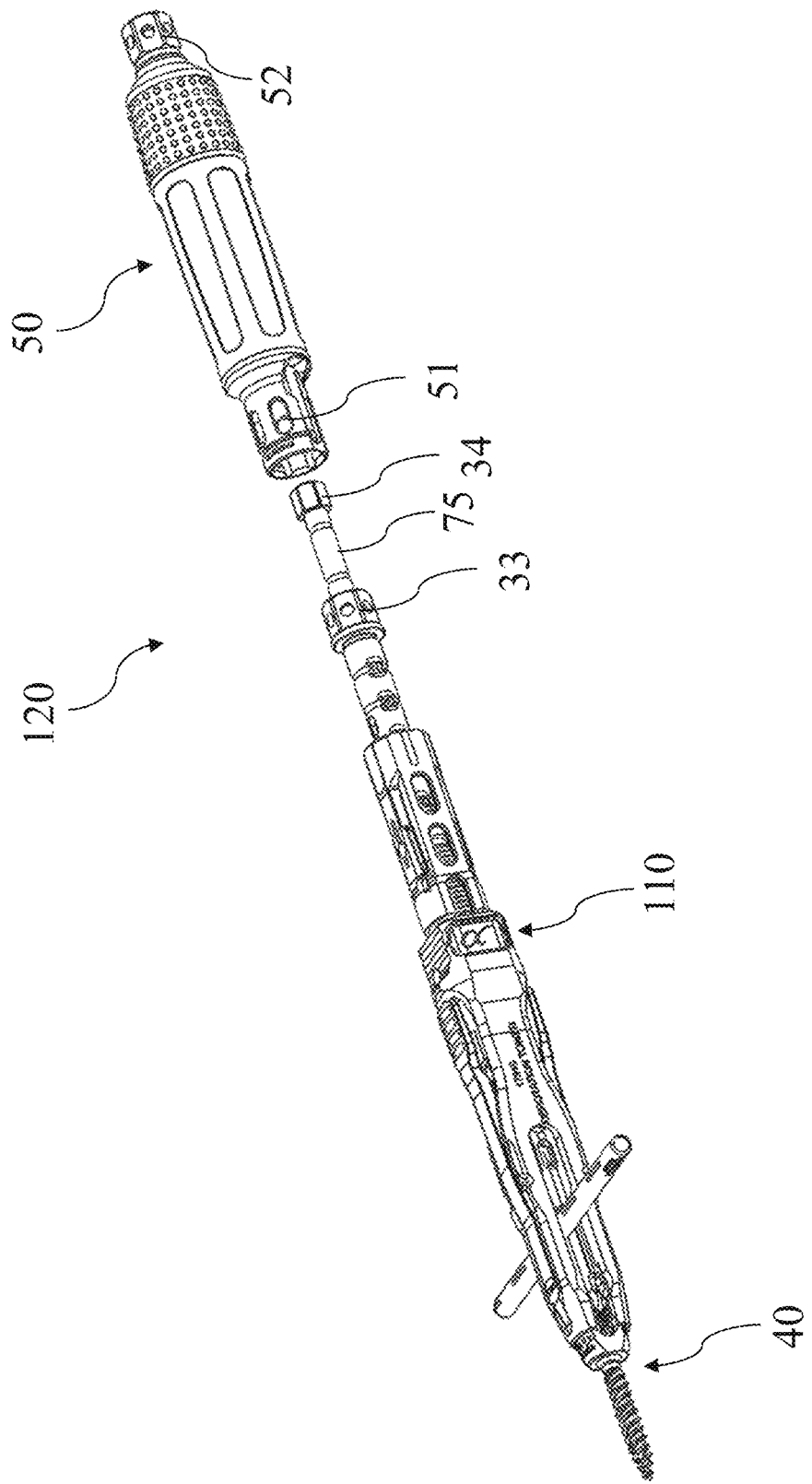
FIG. 18 illustrates a partially exploded perspective view of a third system having the elongated housing assembly, the reducer rod, the tulip assembly, and a driver handle.
Figure 19:
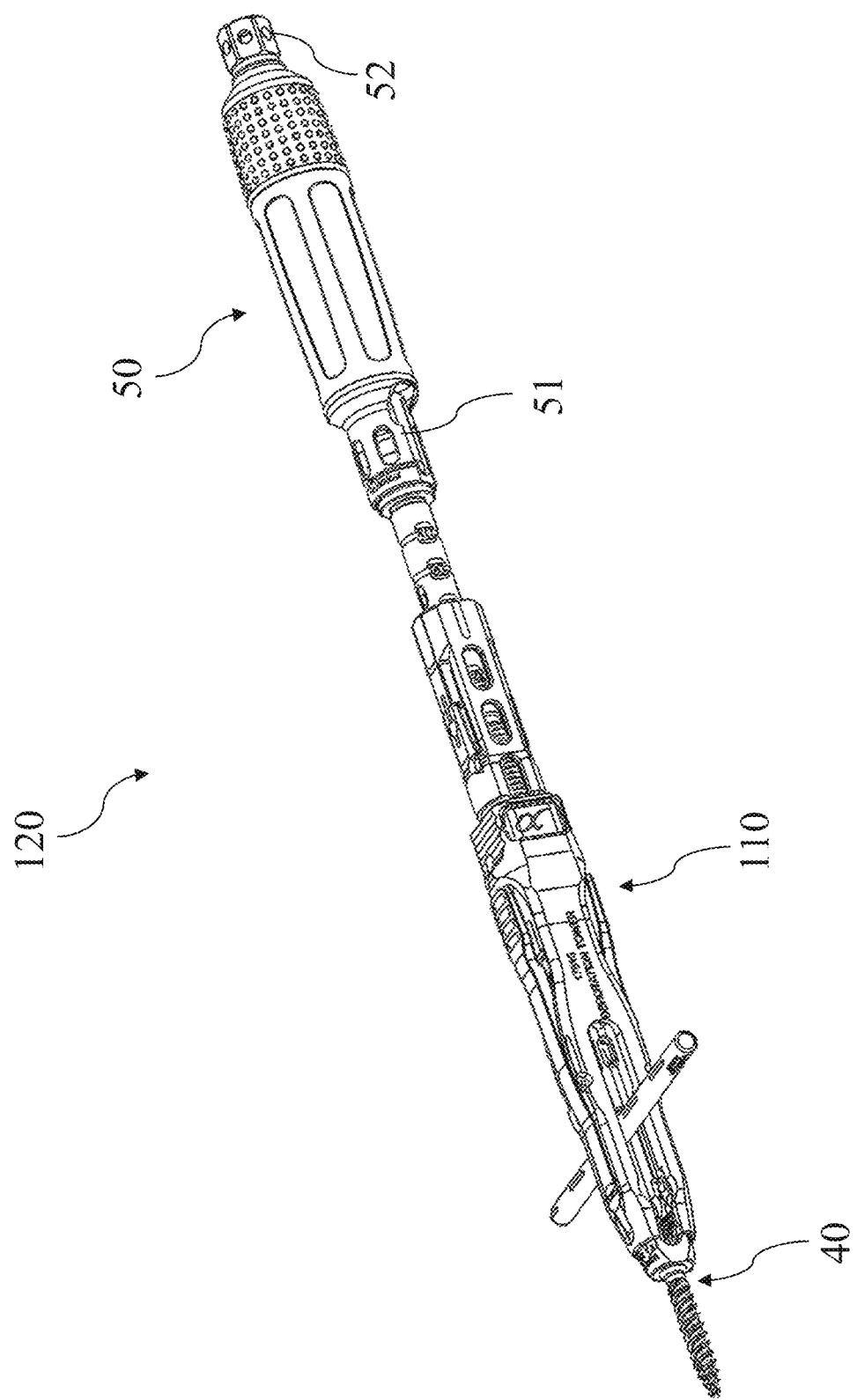
FIG. 19 illustrates an assembled view of the third system of FIG. 18 in pre-tightened configuration.
Figure 20:
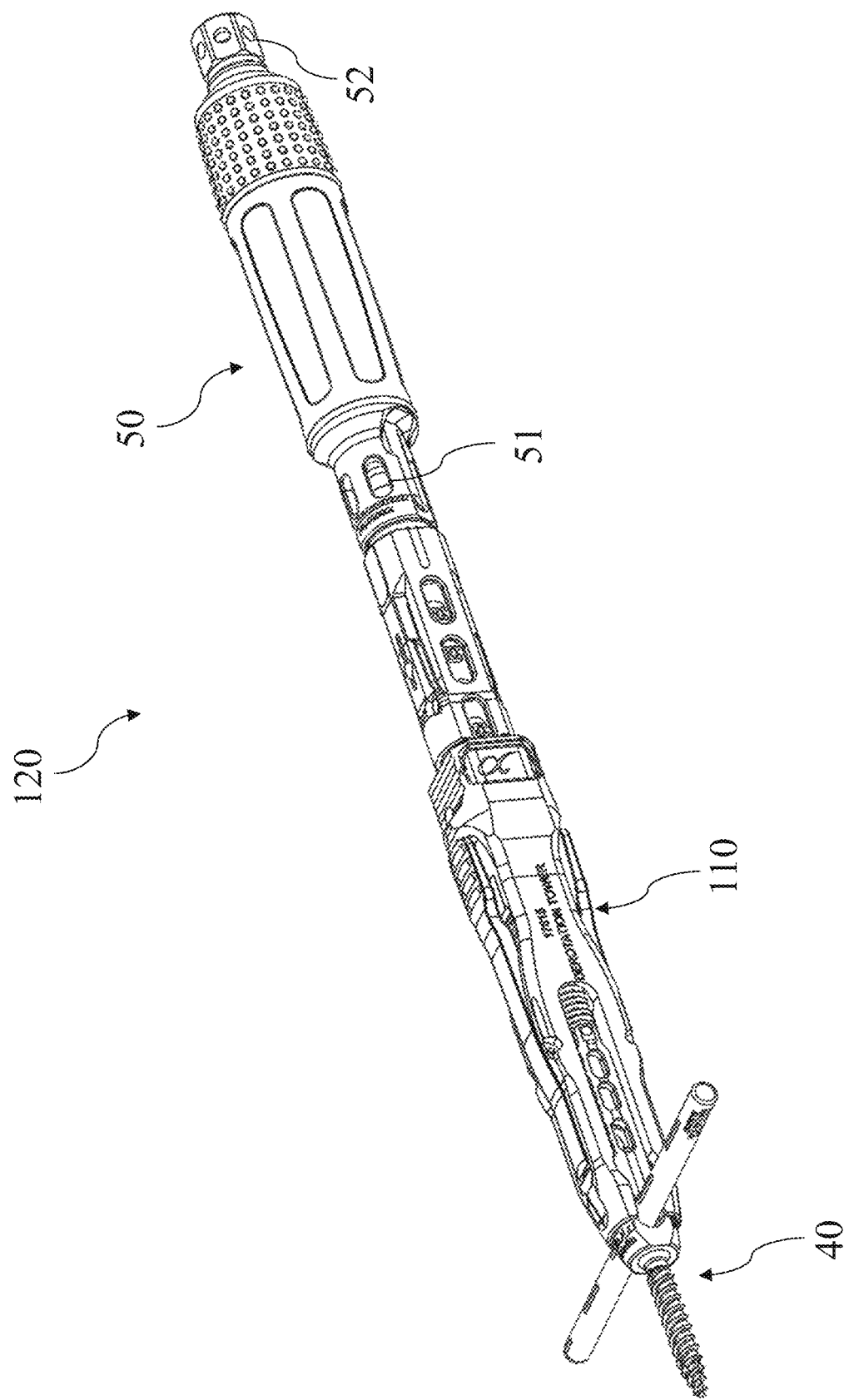
FIG. 20 illustrates an assembled view of the third system of FIG. 18 in a tightened configuration.

Turning now to FIGS. 18-20, a third system 120 is illustrated. FIG. 18 illustrates a partially exploded perspective view of the third system 120 incorporating the second system 110 (with the elongated housing assembly 10, the reducer rod 30, and the tulip assembly 40) with a handle 50. FIG. 19 illustrates the third system 120 of FIG. 18 in pre-tightened configuration and FIG. 20 illustrates the third system 120 in a tightened configuration. As illustrated, the threaded portion 36 of the reducer rod 30 is contained within the body 14 and the longitudinal bore 15 of the elongated housing 11. The proximal end 75a of the drive shaft 75 is free for engagement with the handle 50.

The handle 50 includes a first engagement end 51 for engaging the first, larger engagement mechanism 33 of the reducer rod 30 and an opposing second engagement end 52 for engaging the second, smaller engagement mechanism 34 of the drive shaft 75 that is within the reducer rod 30. When the first engagement end 51 interacts with the engagement mechanism 33 of the reducer rod 30, the reducer rod 30 may be twisted or rotated through twisting or rotation of the handle 50. For example, as illustrated in FIG. 19, the first engagement end 51 has engaged the first, larger engagement mechanism 33. A user may grasp and twist the handle 50, thereby rotating the reducer rod 30 and "screwing" the reducer rod 30 further into the body 14 and the longitudinal bore 15 of the elongated housing 11. The handle 50 may include an internal cavity for receiving portions of the proximal end 13 of the reducer rod 30, such as for receiving the second, smaller engagement mechanism 34 when the handle 50 is engaged with the first, larger engagement mechanism 33.

When the second engagement end 52 interacts with the engagement mechanism 34 of the drive shaft 75, the drive shaft may be rotated through twisting or rotation of the handle 50. The drive shaft may twist or rotate past the distal end of the reducer rod 30 and in some embodiments the drive shaft may directly engage the head of the tulip assembly 40 to apply a tightening force to the tulip assembly 40 (see FIG. 22 below).

Threaded portion 36 of the reducer rod 30 will engage with the internally threaded portion 25 of the insert 20, allowing the reducer rod 30 to be moved distally or proximally through the elongated housing 11 depending on the direction that the handle 50 is rotated. As illustrated in FIG. 20, the reducer rod 30 has been screwed into the elongated housing 11 until the first engagement end 51 (and the not visible first, larger engagement mechanism 33) abuts the proximal end 13 of the elongated housing 11. As also seen in FIG. 20, the rod 42 has been moved distally towards the tulip assembly 40 through the screwing or twisting motion of the reducer rod 30 and the handle 50. This distal advancement of the reducer rod 30 and the rod 42 places the tulip assembly 40 in condition for use in surgical procedures.

Figure 21A:
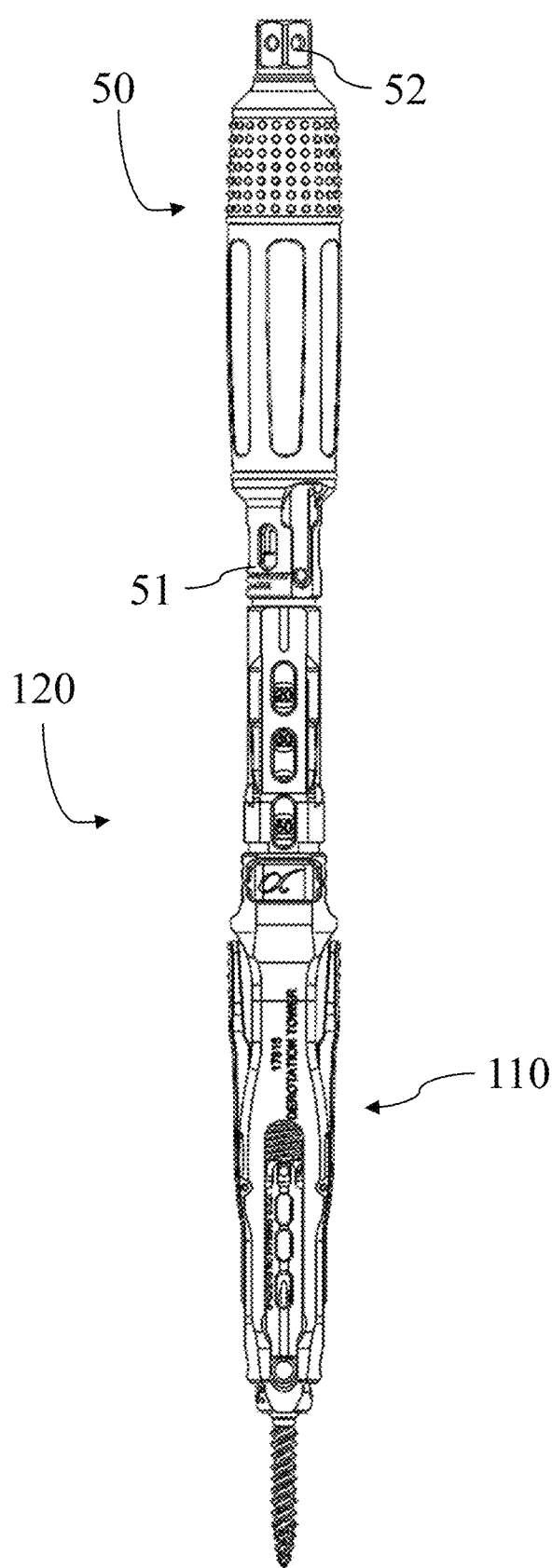
FIG. 21A illustrates a front view of FIG. 20
Figure 21B:
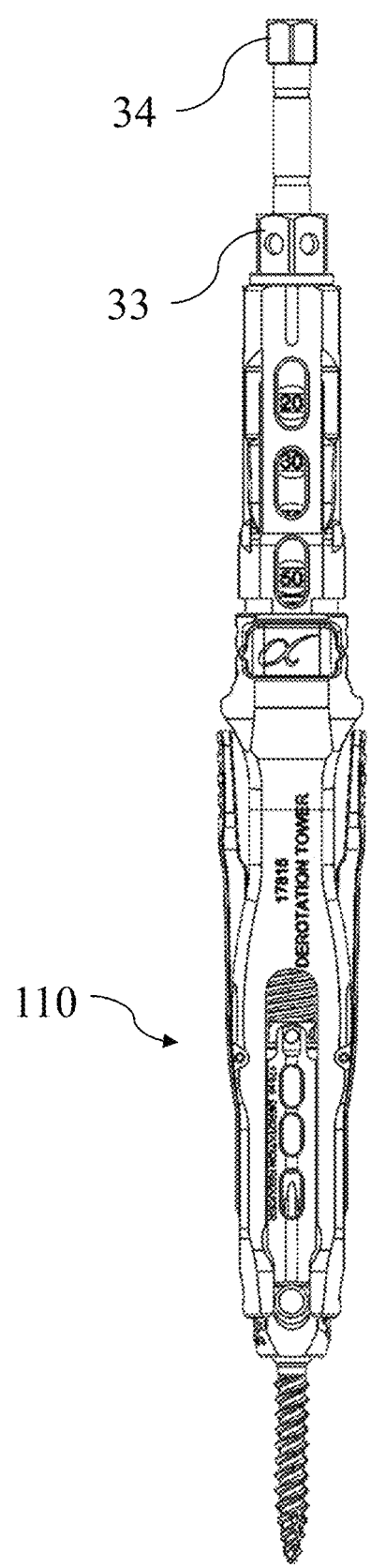
FIG. 21B illustrates the front view of FIG. 21A with the driver handle removed.

FIG. 21A illustrates a front view of FIG. 20 and FIG. 21B illustrates the front view of FIG. 21A with the handle 50 removed. In FIG. 21A, the first engagement end 51 is illustrated abutting the proximal end 13 of the elongated housing 11. In FIG. 21B, the first larger engagement mechanism 33 is illustrated abutting the proximal end 13 of the elongated housing 11. In both views, the rod 42 is illustrated near the housing 43 of the tulip assembly 40, but may not be fully seated in the groove 44 (see FIGS. 17A-17B).

Figure 22:
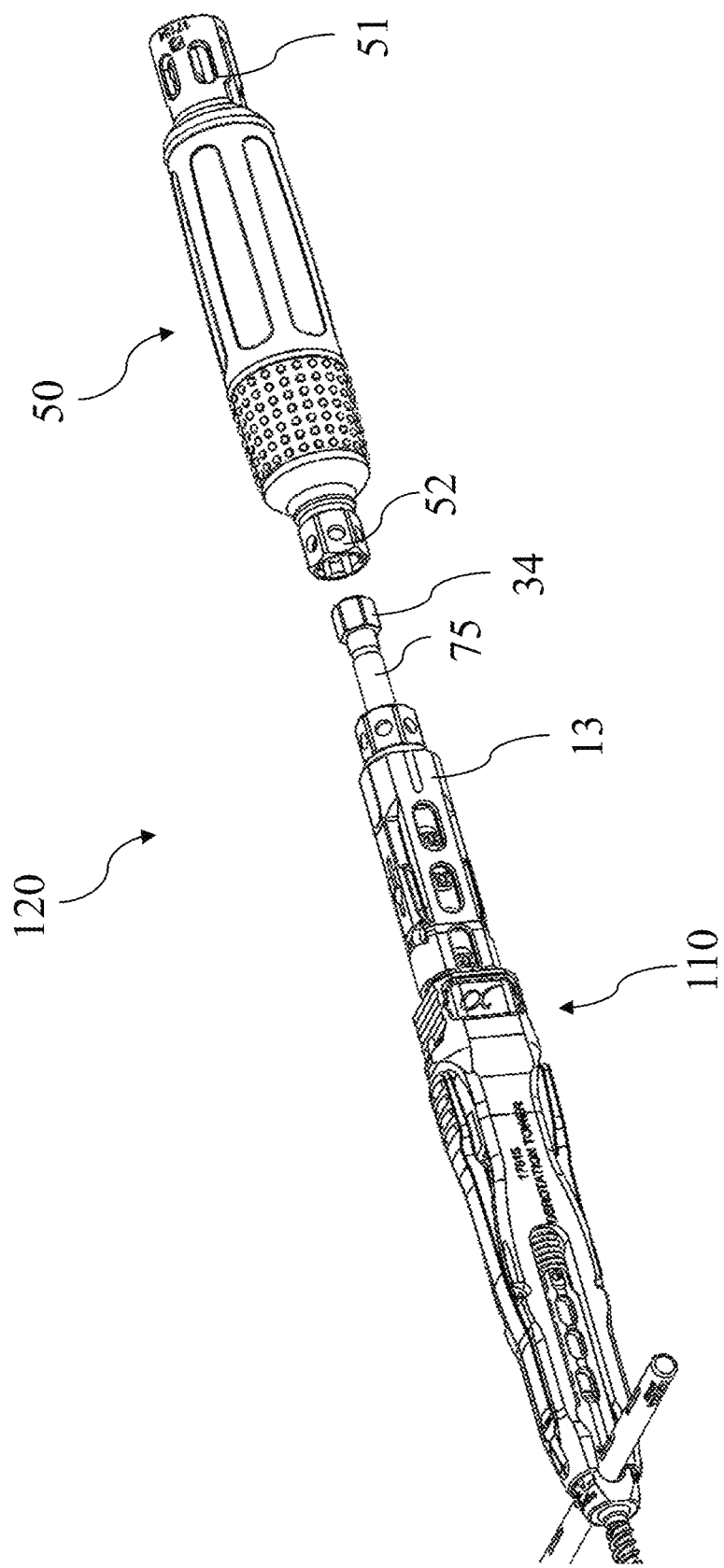
FIG. 22 illustrates a partially exploded view of the third system of FIG. 20.

FIG. 22 illustrates the system of FIG. 18 with the handle 50 in an opposed position. Specifically, the handle 50 is oriented such that the second engagement end 52 is toward the second system 110 for engagement with the second, smaller engagement mechanism 34 of the drive shaft 75. As before, the handle 50 may be twisted and rotated; however, by rotating the second, smaller engagement mechanism 34, the drive shaft 75 positioned within the rod reducer 30 is distally advanced relative to the rod reducer 30. Such rotation via the second engagement end 52 may fully seat the rod 42 within the groove 44 of the housing 43 of the tulip assembly 40, thereby placing the tulip assembly 40 in condition for use in surgical procedures.

In some embodiments, the reducer rod 30 is configured to stop short of fully advancing the rod 42 into the groove 44 of the housing 43. In such embodiments, full advancement may only be achieved by distally advancing the drive shaft 75 so that the set screw 78 that is positioned on the distal end 75b of the drive shaft 75 provides the final force to the rod 42 to fully advance the rod 42 into the groove 44. In some embodiments, this additional advancement of the drive shaft 75 is not carried out until at least some of the external threads of the set screw 78 have engaged at least some of the internal threads on the housing 43.

This delayed or staged advancement of the rod 42 may allow the housing 43 to remain moveable relative the screw 41 until the final tightening of the set screw 78. This may be possible where the housing 43 contains an insert (not illustrated) configured to immobilize the screw 41 relative the housing 43 when the insert is fully depressed within the housing 43, which may be achieved by fully pressing the rod 42 into the groove 44 of the housing 43.

Figure 23A:
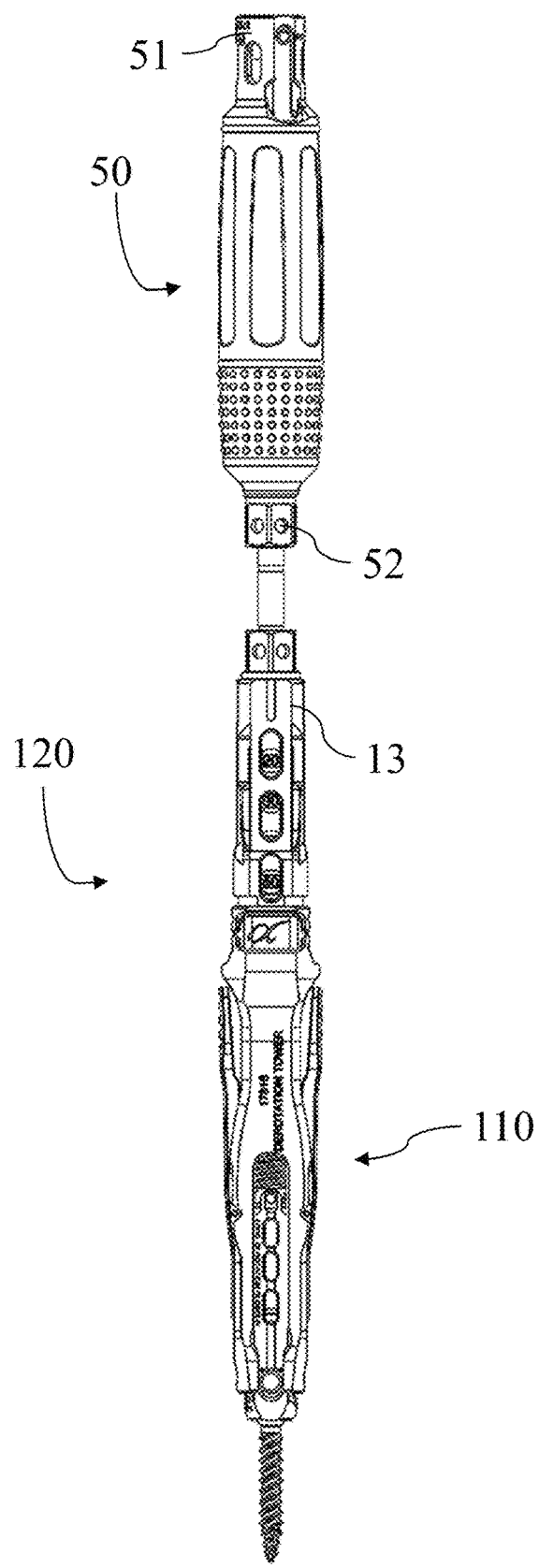
FIG. 23A a front view of FIG. 22 where the driver handle is engaged and FIG. 23B illustrates the front view of FIG. 23A with the driver handle removed.
Figure 23B:
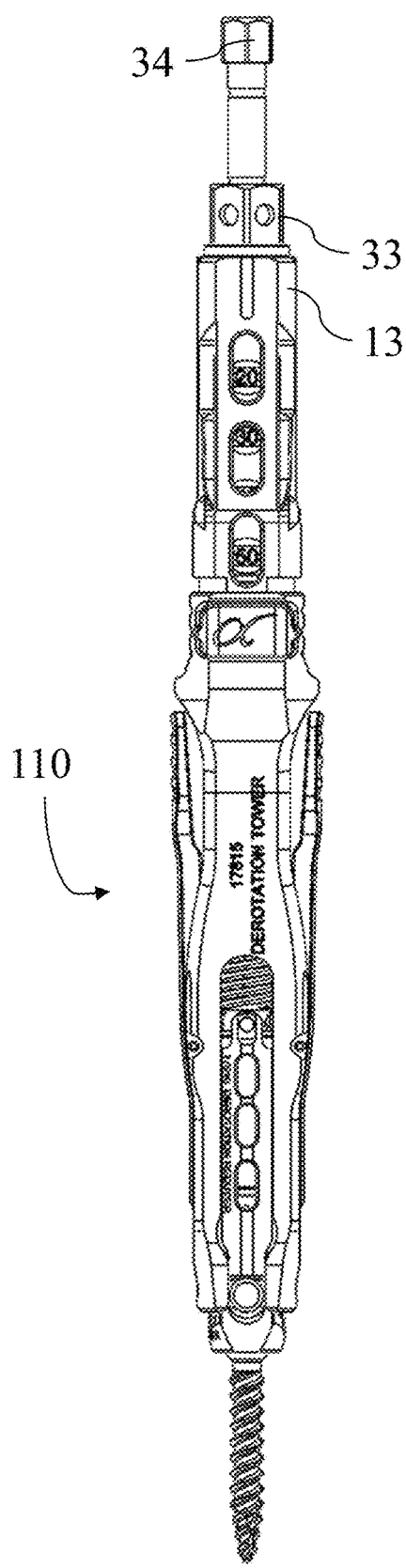

FIG. 23A illustrates a front view of FIG. 22 where the handle 50 is engaged with the second engagement mechanism 34 and FIG. 23B illustrates the front view of FIG. 23A with the handle 50 removed. In FIG. 23A, the second engagement end 52 is illustrated engaged with the second engagement mechanism 34 to finish seating the rod 42 within the groove 44 of the housing 43 of the tulip assembly 40. The same twisting motion may be applied to the handle 50 as with the first engagement mechanism 33.

Figure 24:
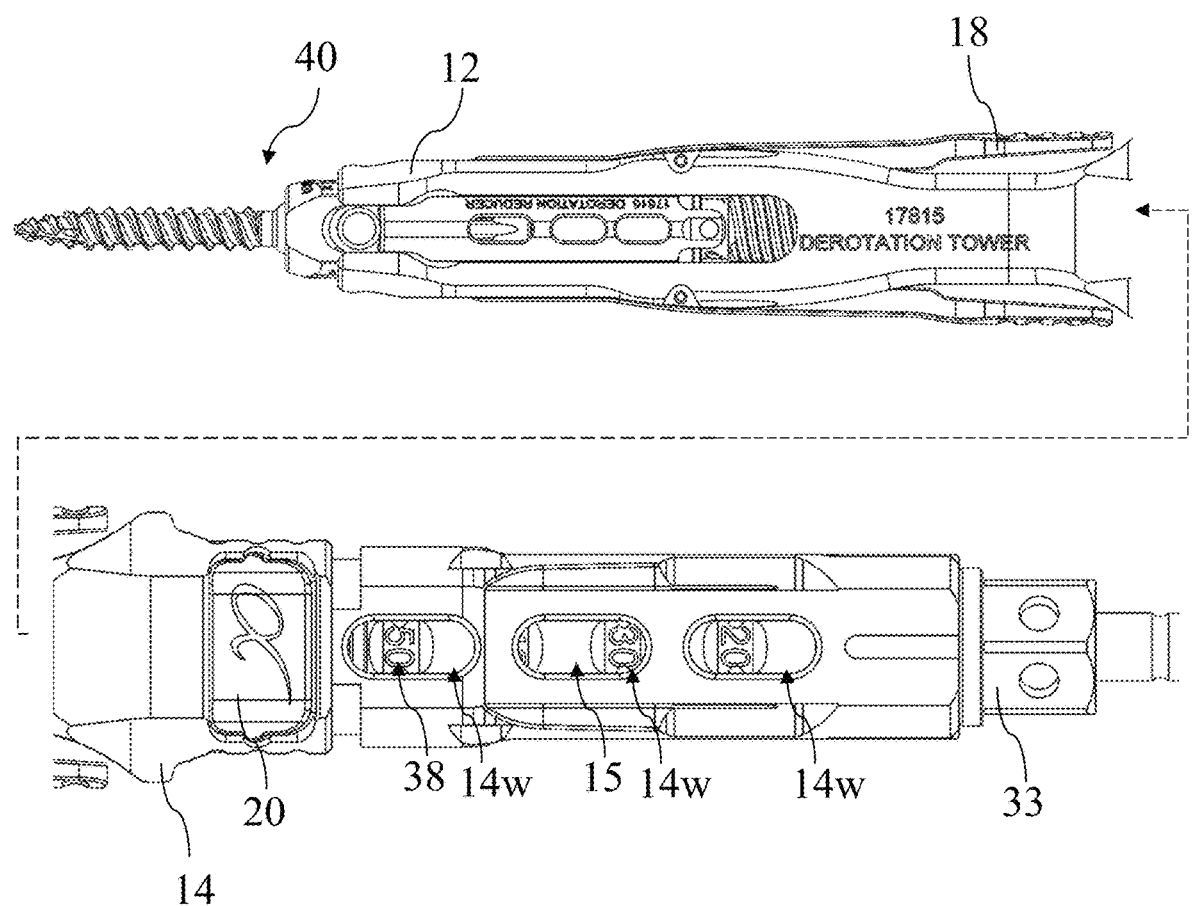
FIG. 24 illustrates an exploded view of FIG. 23B.

FIG. 24 illustrates the reducer rod 30 substantially fully received within the elongated housing 11 and the tulip assembly 40 with the rod 42 fully seated within the housing 43. The distal end 31 of the reducer rod 30 abuts the rod 42 at the distal end 12 of the elongated housing 11. Visible through one or more windows 14w defined in the body 14 of the elongated housing 11 are indicia 38 on the reducer rod 30. The window(s) 14w provide a view into the longitudinal bore 15. The indicia 38 may visually communicate a position of the reducer rod 30 within the body 14 and the longitudinal bore 15. In other configurations, the reducer rod may have different indicia or no indicia.

Figure 25:
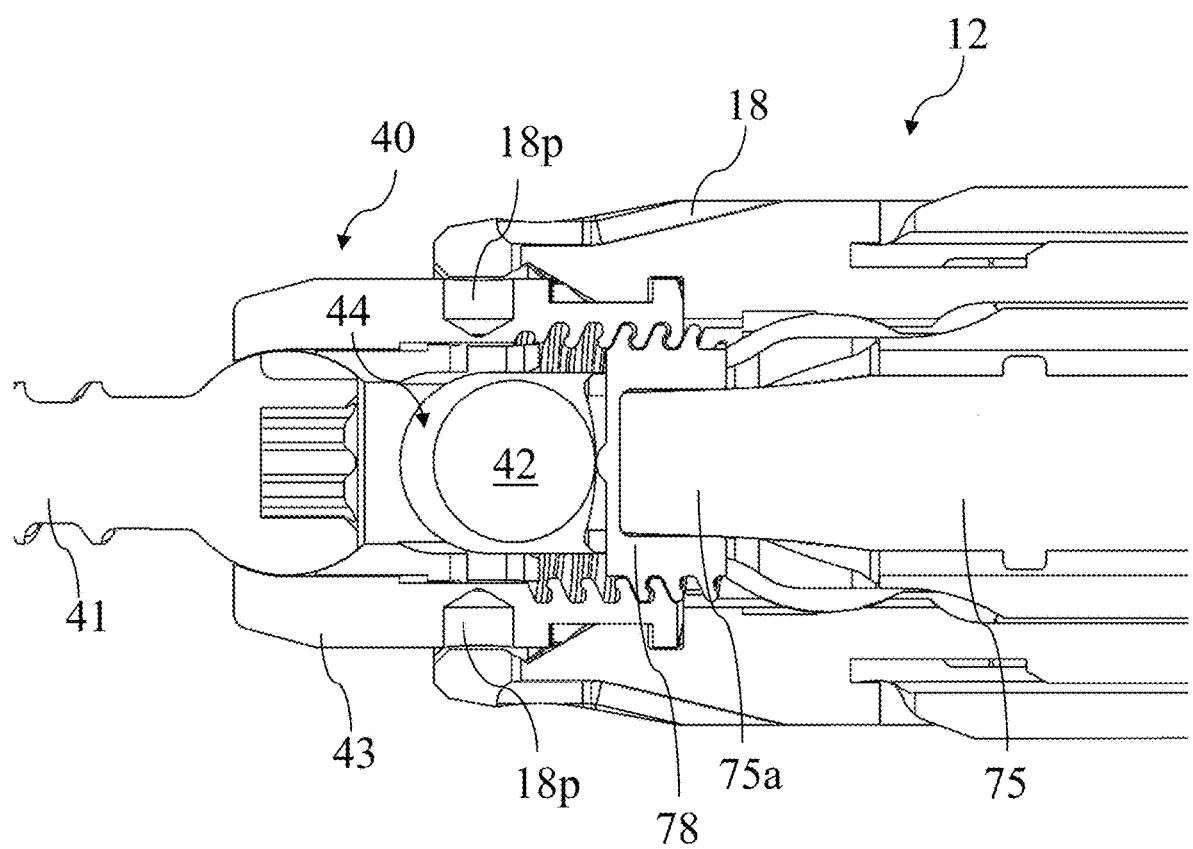
FIG. 25 illustrates a partial close-up cross-sectional view of the proximal end of the elongated housing engaged with the tulip assembly.

FIG. 25 illustrates a partial close-up cross-sectional view of the distal end 12 of the elongated housing 11 engaged with the tulip assembly 40. The drive shaft 75 having a distal end 75b is also illustrated as is a set screw 78 removable secured to the distal end 75b of the drive shaft 75. As illustrated, the rod 42 is received within the groove 44 and the housing 43 of the tulip assembly 40 is received between the distal arms 12a at the distal end 12 of the elongated housing 11. Specifically, pins 18p located near the distal end 12 grasp the housing 43 (e.g., mate with indentations in the housing 43), thereby securing the tulip assembly 40 to the distal end 12 of the elongated housing.

Figure 26A:
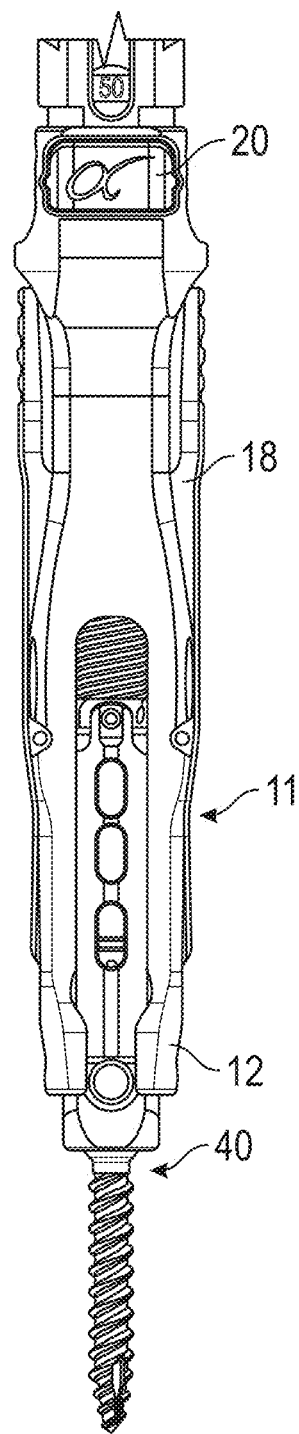
FIGS. 26A through 26C illustrate depression of arms of the elongated housing and removal of the tulip assembly from the elongated housing assembly.
Figure 26B:
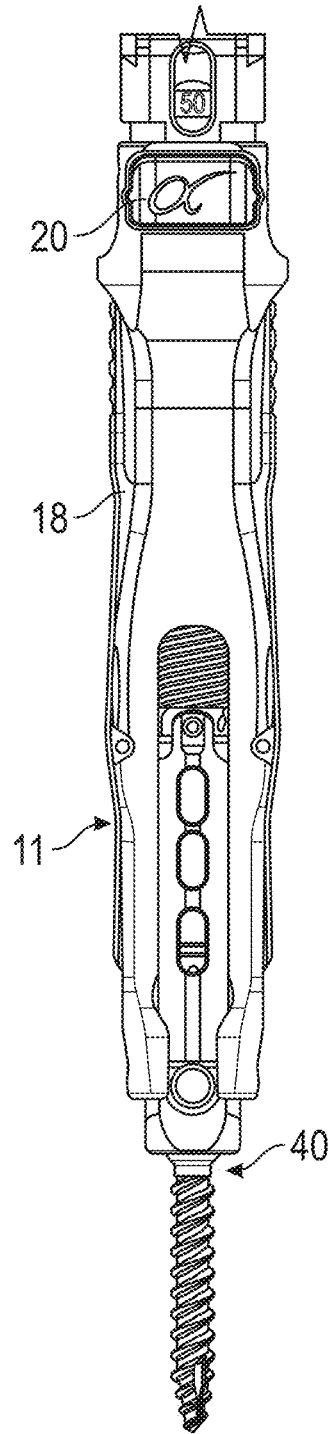
Figure 26C:
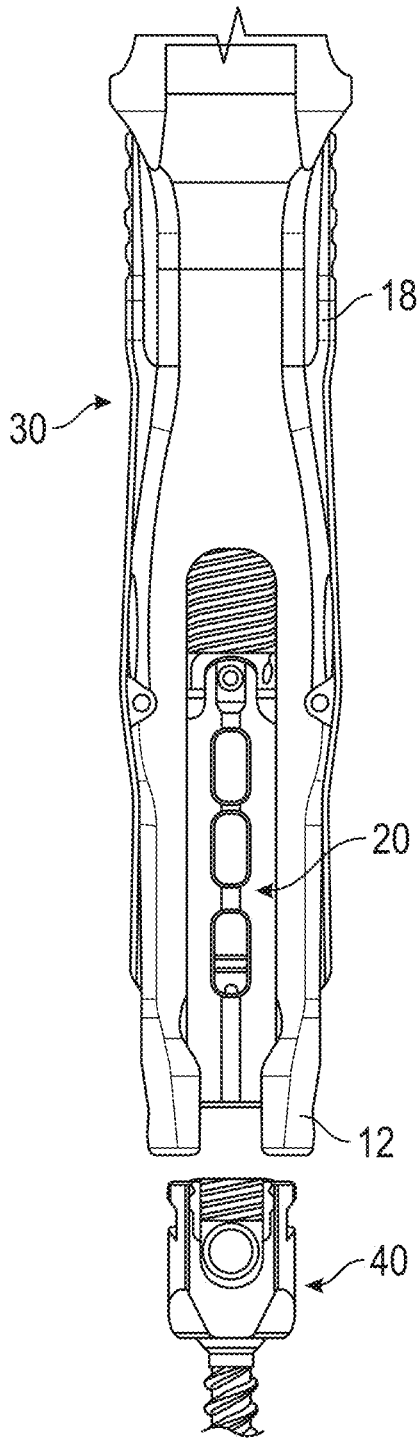
Figure 27:
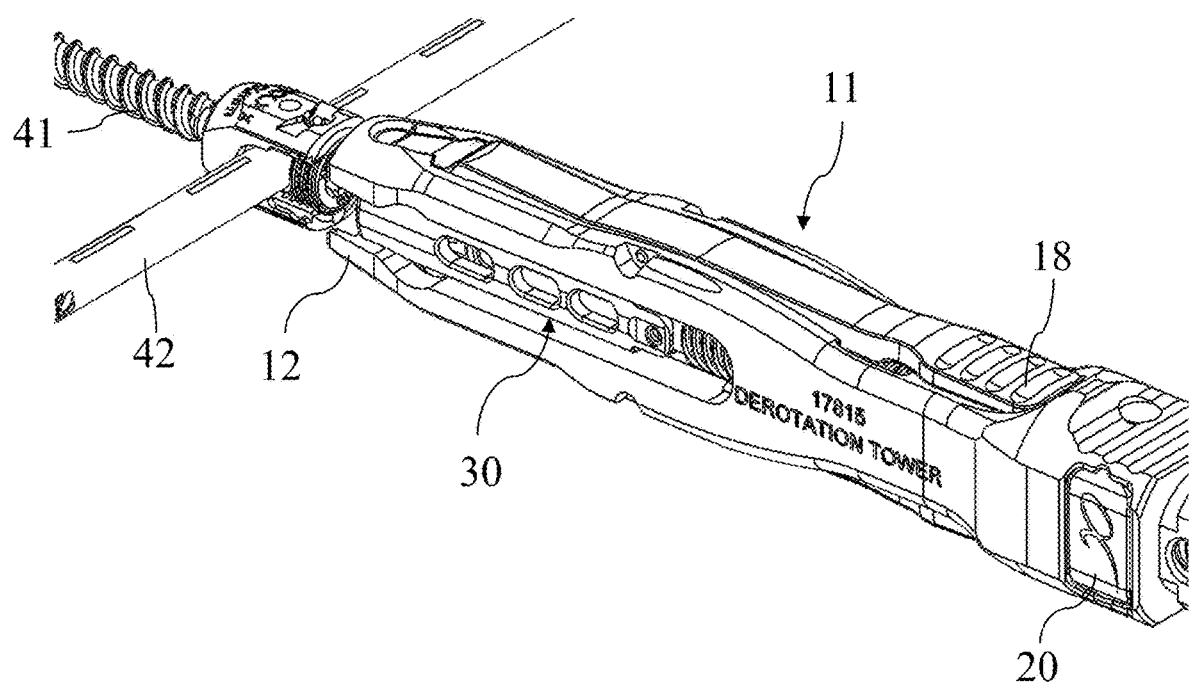
FIG. 27 illustrates a perspective view of FIG. 26B where the arms of the elongated housing assembly have been depressed and the tulip assembly is separated from the proximal end of the elongated housing.
Figure 28:
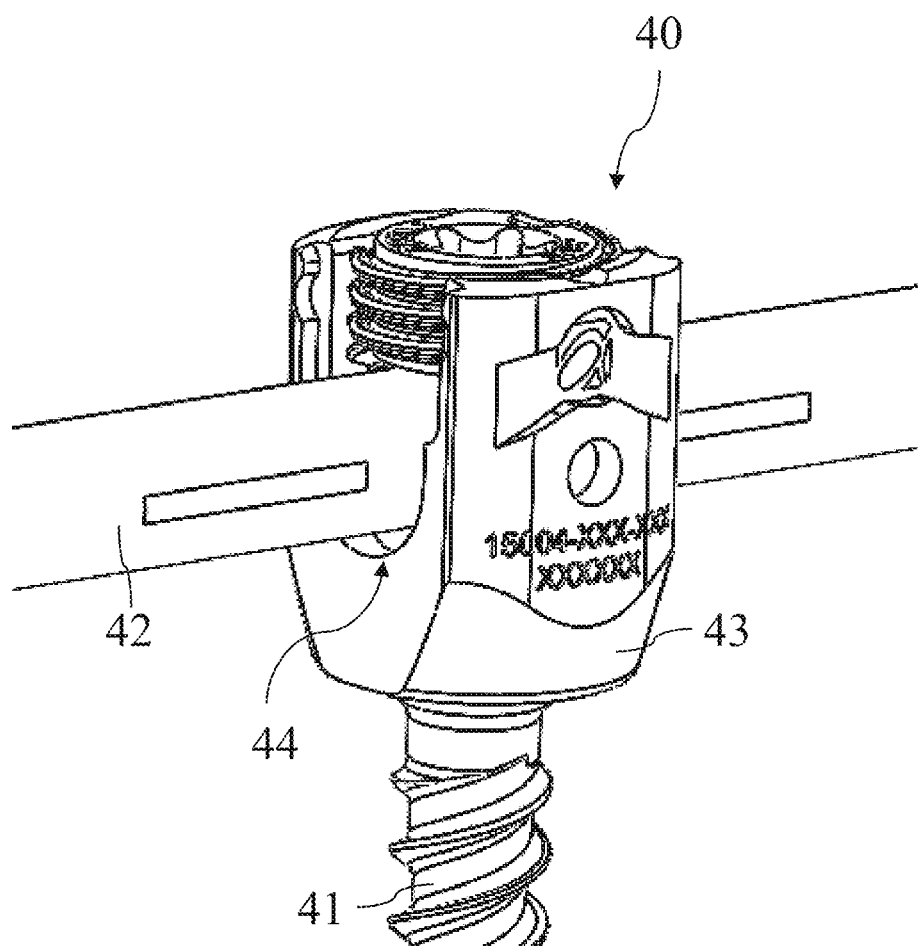
FIG. 28 partially illustrates the tulip assembly.

FIGS. 26A through 26C schematically illustrate depression of the second set of arms 18 of the elongated housing 11 and removal of the tulip assembly 40 from the distal end 12 of the elongated housing assembly 11. FIG. 27 illustrates a perspective view of FIG. 26B where the arms 18 of the housing assembly 10 have been depressed and the tulip assembly 40 is separated from the distal end 12 of the elongated housing 11. When the arms 18 are depressed, the pins 18p (see FIG. 25) will be released from the housing 43 of the tulip assembly 40, such that the tulip assembly 40 can be separated from the distal end 12. Notably, the rod 42 seated in the groove 44 of the housing 43 is separated from the distal end 12 of the elongated housing 11 with the remainder of the tulip assembly 40. FIG. 28 partially illustrates the tulip assembly 40. Specifically, the rod 42 is illustrated as fully seated in the groove 44 of the housing 43. The screw 41 extends proximally from the housing 43. In some embodiments, the screw 41 may be integral with the housing 43.

According to one method of use, the reducer rod 30 will be inserted into the proximal end 13 of the elongated housing 11. The reducer rod 30 may be initially forced or pushed into the longitudinal bore 15 of the elongated housing 11 to a first position. In the first position, the distal end 31 of the reducer rod 30 extends through the longitudinal bore 24 of the insert 20 until the distal end 31 hits a chamfer 25r or ramped portion (FIG. 7A) or internal, sloped surface of the insert 20. This chamfer 25r stops initial proximal advancement of the reducer rod 30 through the elongated housing 11. Additional force may be applied to the reducer rod 30 to ratchet the threaded portion 30 of the reducer rod 30 past the internally threaded portion 25 of the insert 20 to a second position. The additional force applied to the reducer rod 30 displaces the insert 20 within the transverse opening 16 of the elongated housing.

Specifically, the insert 20 moves from an inwardly biased position to an outwardly displaced position. While the insert 20 is in the outwardly displaced position, the threaded portion 36 of the reducer rod 30 may be ratcheted past the threaded portion 25 of the insert 20 to the second position. In the second position, further proximal movement of the reducer rod 30 is stopped because the distal end 31 of the reducer rod 30 contacts the rod 42 in the longitudinal bore 15 of the elongated housing 11.

Once the distal end 31 of the reducer rod 30 contacts the rod 42, the handle 50 may be removably attached to the reducer rod 30. The first engagement end 51 of the handle 50 may engage the first, larger engagement mechanism 33 of the reducer rod 30. The handle 50 may be twisted or rotated, thereby twisting the reducer rod 30, and screwing the threaded portion 36 of the rod 30 through the threaded portion 25 of the insert 20. The reducer rod 30 may be twisted in this way to a third position, where distal advancement of the reducer rod 30 causes the rod 42 to be distally advanced within the longitudinal bore 15. In the third position, the rod 42 abuts the housing 43 of the tulip assembly 40 but may not yet be fully seated in the groove 44 of the housing 43. The second engagement end 52 of the handle 50 may then engage the second, smaller engagement mechanism 34 of the drive shaft. Again, the handle 50 may be twisted to distally advance the drive shaft 75, thereby fully seating the rod 42 within the groove 44 of the housing 43 of the tulip assembly 40.

It will be appreciate that reduction systems can be used in various implementations and surgical devices, such as those for rod reduction, MIST instruments, interbody instruments, etc.

FIG. 29 illustrates a flowchart of an example method 300 of using a rod reduction system, such as any one of the rod reduction systems 100, 110, 120 illustrated in FIGS. 1-28. The method 300 may include inserting a rod reducer 30 into a distal end of the longitudinal bore of the elongated housing to a first position, at 305. For example, the reducer rod may be the reducer rod 30 being inserted into the longitudinal bore 15 of the elongated housing 11 from the elongated housing assembly 10 (see FIG. 1). The first position may be where the distal end 31 of the reducer rod 30 contacts the chamfer 25r of the insert 20 positioned within the elongated housing 11.

Inserting the reducer rod 30 into the proximal end 13 of the longitudinal bore 15 of the elongated housing 11 to a first position may include positioning the distal end 31 of the reducer rod 30 at the proximal end of the longitudinal bore 15 of the elongated housing 11. Additionally, inserting the reducer rod 30 includes forcing the distal end 31 of the reducer rod 30 into the longitudinal bore 15 of the elongated housing 11 and past a proximal chamfer of the insert 20. The distal end 31 of the reducer rod 30 is inserted through the longitudinal bore 24 of the insert 20 such that the reducer rod 30 displaces the insert 20 from an inwardly biased position within the transverse opening 16 to an outwardly displaced position. Additional force causes the body 35 of the inner shaft 30 to continue into the longitudinal bore 24 of the insert 20.

However, the threaded portion 25 of the insert 20 has not engaged the externally threaded portion 36 of the reducer rod 30. The method 300 may also include pushing the rod reducer 30 into the longitudinal bore to a second position such that the external threads of the rod reducer are disengaged by the internally threaded portion of the insert, at 310. That is, the threaded portion 36 of the body 35 may be forced past the internally threaded portion 25 of the insert 20 through a ratchet-type movement or translation of the threads of both the internally threaded portion 25 and the threaded portion 36 of the reducer rod 30. When forcing the reducer rod 30 through the insert 20 and past the internally threaded portion 25 of the insert 20, the reducer rod 30 displaces the insert 20 from an inwardly biased position within the transverse opening 16 to an outwardly displaced position relative to the elongated housing 11 to allow the threaded portion of the rod reducer 30 to translate past the threaded portion of the insert.

The external threads 36 of the rod reducer 30 may ratchet past the threads 27 of the threaded portion 25 of the insert, such as illustrated in FIGS. 8-10. The ramped undercut 39 of the external threads 36 will slide past the ramped undercut 29 of the threads 28 of the threaded portion 25. The second position may be where the distal end 31 of the reducer rod 30 collides with the rod 42 positioned within the elongated housing 11, between the distal arms 12a (see FIG. 16).

The method 300 may further include driving the reducer rod into the longitudinal bore to a third position such that the external threads of the reducer rod are engaged by the internally threaded portion of the insert, at 315. A handle 50 may engage the proximal engagement mechanism 33 of the reducer rod 30 with the first engagement end 51 of the handle 50. As the reducer rod 30 is driven the by handle 50, the externally threaded portion 36 of the reducer rod 30 engages with the threaded portion 25 of the insert 20 and the reducer rod 30 is axially advanced through the longitudinal bore 15 of the elongated housing 11. In the third position, the rod 42 moves axially through the elongated housing 11 with the reducer rod 30.

The method 300 further includes driving a drive shaft into the reducer rod distally beyond a distal end of the reducer rod, at 320. The drive shaft may be the drive shaft 75, which is positioned within a longitudinal bore of the reducer rod 30 and has a proximal end 75a with a second, smaller engagement mechanism 34 and a distal end 75b opposite the proximal end 75a. The second, smaller engagement mechanism 34 may be engaged by the handle 50, specifically a second engagement end 52. Once the handle 50 is engaged with the drive shaft 75, the drive shaft 75 may be driven by rotation of the handle 50. By rotating the second, smaller engagement mechanism 34, the drive shaft 75 positioned within the rod reducer 30 is distally advanced relative to the rod reducer 30. Such rotation via the second engagement end 52 may fully seat the rod 42 within the groove 44 of the housing 43 of the tulip assembly 40, thereby placing the tulip assembly 40 in condition for use in surgical procedures.

Embodiments

The following embodiments are provided as examples only of specific configurations, materials, arrangements, etc. contemplated by the authors of this disclosure:

Embodiment 1. A rod reduction system comprising an elongated housing having a first longitudinal bore therethrough, and a transverse channel extending through the elongated housing at a non-perpendicular angle relative to the first longitudinal bore, the elongated housing further comprising an insert slideable within the transverse channel between an outwardly displaced position and an inwardly biased position, the insert having a first longitudinal bore therethrough alignable with the first longitudinal bore of the elongated housing, and the insert comprising a threaded portion; and a reducer slidably receivable within the first longitudinal bore of the elongated housing, the reducer having a proximal end, and a distal end opposite the proximal end, with a shaft extending from the distal end to the proximal end, the shaft having a threaded portion; wherein the rod reduction system comprises (i) a first, rapid reduction position wherein the reducer displaces the insert to the outwardly displaced position such that the threaded portion of the insert does not engage the threaded portion of the shaft of the reducer, and (ii) a second, engaged position wherein the threaded portion of the insert in the inwardly biased position engages the threaded portion of the shaft of the reducer.

Embodiment 2. The rod reduction system of Embodiment 1, further comprising a handle for engaging the proximal end of the reducer.

Embodiment 3. The rod reduction system of Embodiment 1 or Embodiment 2, wherein the non-perpendicular angle relative to the first longitudinal bore comprises an angle of about 40 degrees to about 80 degrees.

Embodiment 4. The rod reduction system of Embodiment 1 or Embodiment 2, wherein the non-perpendicular angle relative to the first longitudinal bore comprises an angle of about 60 degrees to about 75 degrees.

Embodiment 5. The rod reduction system of Embodiment 1 or Embodiment 2, wherein the non-perpendicular angle relative to the first longitudinal bore comprises an angle of about 70 degrees.

Embodiment 6. The rod reduction system of any one of Embodiments 1, 2, 3, 4, or 5, wherein the first longitudinal bore of the insert has an angle corresponding to the non-perpendicular angle of the transverse channel, an exterior of the body defining at least one pocket for receiving a spring.

Embodiment 7. The rod reduction system of Embodiment 6, wherein the spring biases the insert towards the inwardly biased position, allowing the threaded portion of the insert to engage the threaded portion of the shaft.

Embodiment 8. The rod reduction system of Embodiment 6, wherein the body of the insert defines the first longitudinal bore and the first longitudinal bore includes a proximal chamfer, wherein the distal end of the reducer must pass the proximal chamfer to displace the insert to the outwardly displaced position.

Embodiment 9. The rod reduction system of any one of Embodiments 1 through 8, wherein the threaded portion of the insert comprises threads having an angled surface corresponding to an angled surface of thread of the threaded portion of the reducer.

Embodiment 10. The rod reduction system of any one of Embodiments 1 through 9, wherein the reducer comprises a second longitudinal bore therethrough, and wherein the rod reduction system further comprises a drive shaft positioned within the second longitudinal bore, the drive shaft having a proximal end and a distal end having a working tip.

Embodiment 11. The rod reduction system of Embodiment 10, wherein the proximal end of the drive shaft is configured to engage a handle, and wherein the working tip at the distal end of the drive shaft is configured to releasably engage a set screw.

Embodiment 12. The rod reduction system of Embodiment 10 or 11, wherein the proximal end of the drive shaft extends proximally of the proximal end of the reducer.

Embodiment 13. The rod reduction system of any one of Embodiments 1 through 12, wherein the distal end of the elongated housing is configured to releasably engage a tulip of a pedicle screw, the tulip having a saddle configured to receive a portion of a fixation rod.

Embodiment 14. The rod reduction system of any one of Embodiments 1 through 13, wherein the distal end of the elongated housing is configured to accommodate a fixation rod generally defining an axis that is substantially perpendicular to the first longitudinal bore, and wherein the reducer is configured to be advanced distally relative to the elongated housing in order to translate distally the fixation rod accommodated by the elongated housing.

Embodiment 15. The rod reduction system of Embodiment 14, wherein the reducer is configured to advance the fixation rod at least partially into the tulip without fully seating the fixation rod in the tulip.

Embodiment 16. The rod reduction system of Embodiment 15, wherein the drive shaft is configured to be advanced distally relative to the reducer in order to fully seat the fixation rod in the tulip.

Embodiment 17. The rod reduction system of Embodiment 16, wherein the a set screw is removable attached to the working tip of the drive shaft when the draft fully seats the fixation rod in the tulip.

Embodiment 18. The rod reduction system of Embodiment 17, wherein the reducer advances the fixation rod into the tulip sufficiently enough to allow the set screw to at least partially engage with the tulip.

Embodiment 19. The rod reduction system of Embodiment 18, wherein the tool tip of the drive shaft advances the set screw distally by rotating the set screw, which rotation causes threads of the set screw to engage corresponding threads of the tulip, such that at least a portion of the force applied to the fixation rod is applied by the set screw while the set screw is engaged with the tulip.

Embodiment 20. A rod reduction system comprising an inner shaft having a distal tip end, and a threaded portion; and a housing having a longitudinal bore therethrough to slidably receive the inner shaft, and a transverse slot extending through the housing at a predetermined angle relative to the longitudinal bore, the housing further comprising an actuator slideable within the transverse slot between an outwardly displaced position and an inwardly biased position, the actuator having a longitudinal bore therethrough alignable with the longitudinal bore of the housing, and the actuator longitudinal bore comprising a threaded portion; the rod reduction system having a first mode and a second mode, wherein the first mode comprises a rapid reduction mode wherein the shaft displaces the actuator to the outwardly displaced position such that the threaded portion of the actuator does not engage the threaded portion of the shaft, which allows the shaft to bypass the threaded portion of the actuator; and the second mode comprises a driving mode wherein the actuator is in the inward biased position such that the threaded portion of the actuator engages the threaded portion of the shaft.

Embodiment 21. The rod reduction system of Embodiment 20, wherein the rod reduction system has a third mode comprising a rapid release mode wherein the actuator is pressed from the inward biased position to the outwardly displaced position such that the threaded portion of the actuator disengages the threaded portion of the shaft to allow the shaft to be translated proximally relative to the housing.

Embodiment 22. The rod reduction system of Embodiment 20 or 21, wherein threads of the threaded portion of the actuator define an angle parallel to an angle of threads of the threaded portion of the inner shaft.

Embodiment 23. The rod reduction system of any one of Embodiments 20, 21, or 22, wherein the actuator comprises a spring-loaded mechanism for engaging the threaded portion of the shaft.

Embodiment 24. The rod reduction system of any one of Embodiments 20 through 23, wherein in the rapid reduction mode, an angled surface of threads of the threaded portion of the inner shaft slides against an angled surface of threads of the threaded portion of the actuator, allowing the shaft to displace the actuator to the outwardly displaced position.

Embodiment 25. The rod reduction system of any one of Embodiments 20 through 24, wherein in the rapid reduction mode, the shaft displaces the actuator with a ratchet-type motion.

Embodiment 26. The rod reduction system of any one of Embodiments 20 through 25, wherein the predetermined angle relative to the longitudinal bore comprises an angle of at least 50° relative to the longitudinal bore.

Embodiment 27. The rod reduction system of any one of Embodiments 20 through 26, wherein the longitudinal bore of the actuator comprises the threaded portion and a non-threaded portion, the longitudinal bore having an angle relative to the actuator corresponding to the predetermined angle of the transverse slot.

Embodiment 28. A method of using a rod reduction system, the method comprising positioning an insert within an elongated housing such that a longitudinal bore of the insert is aligned with a longitudinal bore of the elongated housing; inserting a shaft into a proximal end of the longitudinal bore of the elongated housing to a first position; engaging external threads of the shaft by an internally threaded portion of the insert in the first position; pushing the shaft into the longitudinal bore to a second position such that the external threads of the shaft are disengaged by the internally threaded portion of the insert; and twisting the shaft to a third position within the longitudinal bore, the third position being different than the first position and the second position.

Embodiment 29. The method of Embodiment 28, wherein positioning an insert within the elongated housing comprises sliding a body of the insert into a slot extending crosswise to the longitudinal bore of the elongated housing, the slot being non-perpendicular to the longitudinal bore and the body having an angle matching the non-perpendicular angle of the slot; and aligning the longitudinal bore of the insert with the longitudinal bore of the elongated housing.

Embodiment 30. The method of Embodiment 28 or Embodiment 29, wherein inserting a shaft into a proximal end of the longitudinal bore of the elongated housing to a first position comprises positioning a distal end of the shaft at the proximal end of the longitudinal bore of the elongated housing; and forcing the distal end of the shaft into the longitudinal bore of the elongated housing and past a proximal chamfer of the insert.

Embodiment 31. The method of any one of Embodiments 28, 29, or 30, further comprising disengaging the external threads of the shaft from the internally threaded portion of the insert and removing the shaft from the elongated housing.

Embodiment 32. The method of Embodiment 31, wherein disengaging the external threads of the shaft from the internally threaded portion of the insert comprises pressing the insert from an inwardly biased position where the internally threaded portion of the insert engaged with the external threads of the shaft to an outwardly displaced position such that the external threads of the shaft separate from the internally threaded portion of the insert.

Embodiment 33. A method of using a rod reduction system, the method comprising:
  releasably securing a distal end of an elongated housing to a tulip assembly of a pedicle screw;
  distally advancing, in a first configuration, a rod reducer contained within the elongated housing to push a fixation rod toward the tulip assembly;
  distally advancing, in a second configuration, the rod reducer to push the fixation rod at least partially into a saddle of the tulip assembly;
  wherein the elongated housing comprises a first longitudinal bore to house the rod reducer, a transverse slot that is non-perpendicular to the first longitudinal bore, an insert positioned within the transverse slot having a bore substantially aligned with the first longitudinal bore, at least a portion of the bore having internal threads configured to engage with threads on an exterior surface of the rod reducer; and
  wherein the insert is configured to transition between the first configuration and the second configuration, the first configuration achieved when the rod reducer is translated distally relative to the elongated housing pushing against the threads of the insert causing the insert to translate within the slot from a resting position, the second configuration achieved when a biasing element returns the insert to its resting position such that the threads of the slot engage the threads of the rod reducer so that rotation of the rod reducer produced axial translation of the rod reducer relative to the elongated housing.

Embodiment 34. The method of Embodiment 33, further comprising:
  distally advancing, in a third configuration, a drive shaft contained within the rod reducer to push the fixation rod fully into the saddle of the tulip assembly;
  wherein the rod reducer comprises a second longitudinal bore to house the drive shaft, the second longitudinal bore having internal threads configured to engage external threads of the drive shaft so that rotation of the drive shaft relative to the rod reducer axially translates the drive shaft relative to the rod reducer.

Embodiment 35. The method of Embodiment 34, wherein a set screw is releasably secured to a distal end of the drive shaft, such that distal advancement of the set screw brings it into contact with the tulip assembly, and wherein rotation of the set screw causes a thread on the set screw to threadingly engage a thread of the tulip assembly.

Embodiment 36. The method of Embodiment 37, further comprising: disengaging the distal end of the elongated housing from the tulip assembly.

Embodiment 37. An advancement mechanism comprising:
  an elongated housing having a longitudinal bore extending therethrough from a proximal end to a distal end, the elongated housing having a slot extending across the longitudinal bore at an angle to the longitudinal bore that is less than 90 degrees;
  an insert positioned in the slot and configured to translate within the slot from a resting position to a displaced position, the insert having a bore extending therefore, the bore being substantially aligned with the longitudinal bore, the bore having at least one internal thread;
  an inner shaft having exterior threads configured to engage at least one internal thread of the bore, the inner shaft sized to fit within the longitudinal bore.

Embodiment 38. The advancement mechanism of Embodiment 37, further comprising a biasing element configured to maintain the insert in the resting position and to return the insert to the resting position after the insert has been moved to the displaced position.

Embodiment 39. The advancement mechanism of Embodiment 37 or 38, wherein a first distal advancement of the inner shaft within the longitudinal bore causes displacement of the insert from the resting position to the displaced position, wherein the first distal advancement is achieved by applying a distal force on the inner shaft.

Embodiment 40. The advancement mechanism of any one of Embodiment 37, 38, or 39, wherein a second distal advancement of the inner shaft is achieved by rotating the inner shaft relative to the elongated housing, which rotation causes the second distal advancement because the exterior threads of the inner shaft are threadingly engaged with the at least one internal thread of the bore when the insert is in the resting position.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It should also be noted that some of the embodiments disclosed herein may have been disclosed in relation to a particular approach (e.g., lateral); however, other approaches (e.g., anterior, posterior, transforaminal, etc.) are also contemplated.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. In one embodiment, the terms "about" and "approximately" refer to numerical parameters within 10% of the indicated range.

The terms "a," "an," "the," and similar referents used in the context of describing the embodiments of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the embodiments of the present disclosure and does not pose a limitation on the scope of the present disclosure. No language in the specification should be construed as indicating any non-claimed element essential to the practice of the embodiments of the present disclosure.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the author(s) of this disclosure for carrying out the embodiments disclosed herein. Of course, variations on these described embodiments will become apparent to those of ordinary skill in the art upon reading the foregoing description. The author(s) expects skilled artisans to employ such variations as appropriate, and the author(s) intends for the embodiments of the present disclosure to be practiced otherwise than specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of this disclosure so claimed are inherently or expressly described and enabled herein.

Furthermore, if any references have been made to patents and printed publications throughout this disclosure, each of these references and printed publications are individually incorporated herein by reference in their entirety.

In closing, it is to be understood that the embodiments disclosed herein are illustrative of the principles of the present disclosure. Other modifications that may be employed are within the scope of this disclosure. Thus, by way of example, but not of limitation, alternative configurations of the embodiments of the present disclosure may be utilized in accordance with the teachings herein. Accordingly, the present disclosure is not limited to that precisely as shown and described.

The invention claimed is:

1. A rod reduction system comprising an elongated housing having a first longitudinal bore therethrough, and a transverse channel extending through the elongated housing at a non-perpendicular angle relative to the first longitudinal bore, the elongated housing further comprising an insert slideable within the transverse channel between an outwardly displaced position and an inwardly biased position, the insert having a body with a first longitudinal bore therethrough alignable with the first longitudinal bore of the elongated housing, and the insert comprising a threaded portion; and
a reducer slidably receivable within the first longitudinal bore of the elongated housing, the reducer having a proximal end, and a distal end opposite the proximal end, with a shaft extending from the distal end to the proximal end, the shaft having a threaded portion; and
wherein the rod reduction system comprises (i) a first, rapid reduction position wherein the reducer displaces the insert to the outwardly displaced position such that the threaded portion of the insert does not engage the threaded portion of the shaft of the reducer, and (ii) a second, engaged position wherein the threaded portion of the insert in the inwardly biased position engages the threaded portion of the shaft of the reducer.

2. The rod reduction system of claim 1, further comprising a handle for engaging the proximal end of the reducer.

3. The rod reduction system of claim 1, wherein the non-perpendicular angle relative to the first longitudinal bore comprises an angle of about 40 degrees to about 80 degrees.

4. The rod reduction system of claim 1, wherein the non-perpendicular angle relative to the first longitudinal bore comprises an angle of about 60 degrees to about 75 degrees.

5. The rod reduction system of claim 1, wherein the non-perpendicular angle relative to the first longitudinal bore comprises an angle of about 70 degrees.

6. The rod reduction system of claim 1, wherein the first longitudinal bore of the insert has an angle corresponding to the non-perpendicular angle of the transverse channel, and an exterior of the body defining a pocket for receiving a spring.

7. The rod reduction system of claim 6, wherein the spring biases the insert towards the inwardly biased position, allowing the threaded portion of the insert to engage the threaded portion of the shaft.

8. The rod reduction system of claim 6, wherein the body of the insert defines the first longitudinal bore of the insert and the first longitudinal bore of the insert includes a proximal chamfer, wherein the distal end of the reducer must pass the proximal chamfer to displace the insert to the outwardly displaced position.

9. The rod reduction system of claim 1, wherein the threaded portion of the insert comprises threads having an angled surface corresponding to an angled surface of thread of the threaded portion of the reducer.

10. The rod reduction system of claim 1, wherein the reducer comprises a second longitudinal bore therethrough, and wherein the rod reduction system further comprises a drive shaft positioned within the second longitudinal bore, the drive shaft having a proximal end and a distal end having a working tip.

11. The rod reduction system of claim 10, wherein the proximal end of the drive shaft is configured to engage a handle, and wherein the working tip at the distal end of the drive shaft is configured to releasably engage a set screw.

12. The rod reduction system of claim 10, wherein the proximal end of the drive shaft extends proximally of the proximal end of the reducer.

13. The rod reduction system of claim 12, wherein a distal end of the elongated housing is configured to releasably engage a tulip of a pedicle screw, the tulip having a saddle configured to receive a portion of a fixation rod.

14. The rod reduction system of claim 13, wherein the distal end of the elongated housing is configured to accommodate a fixation rod generally defining an axis that is substantially perpendicular to the first longitudinal bore of the elongated housing, and wherein the reducer is configured to be advanced distally relative to the elongated housing in order to translate distally the fixation rod accommodated by the elongated housing.

15. The rod reduction system of claim 14, wherein the reducer is configured to advance the fixation rod at least partially into the tulip without fully seating the fixation rod in the tulip.

16. The rod reduction system of claim 15, wherein the drive shaft is configured to be advanced distally relative to the reducer in order to fully seat the fixation rod in the tulip.

17. The rod reduction system of claim 16, wherein the set screw is removably attached to the working tip of the drive shaft when the drive shaft fully seats the fixation rod in the tulip.

18. The rod reduction system of claim 17, wherein the reducer advances the fixation rod into the tulip sufficiently enough to allow the set screw to at least partially engage with the tulip.

19. The rod reduction system of claim 18, wherein the working tip of the drive shaft advances the set screw distally by rotating the set screw, which rotation causes threads of the set screw to engage corresponding threads of the tulip, such that at least a portion of the force applied to the fixation rod is applied by the set screw while the set screw is engaged with the tulip.

20. A method of using a rod reduction system, the method comprising:
    positioning an insert within an elongated housing such that a longitudinal bore of the insert is aligned with a longitudinal bore of the elongated housing;
    inserting an inner shaft into a distal end of the longitudinal bore of the elongated housing to a first position;
    engaging external threads of the inner shaft by an internally threaded portion of the insert in the first position;
    pushing the inner shaft into the longitudinal bore of the elongated housing to a second position such that the external threads of the inner shaft are disengaged by the internally threaded portion of the insert; and
    twisting the inner shaft to a third position within the longitudinal bore of the elongated housing, the third position being different than the first position and the second position.

* * * * *